(12) United States Patent
Brandwine et al.

(10) Patent No.: US 10,067,781 B2
(45) Date of Patent: *Sep. 4, 2018

(54) SERVICE MANIFESTS

(71) Applicant: Amazon Technologies, Inc., Seattle, WA (US)

(72) Inventors: Eric Jason Brandwine, Haymarket, VA (US); Don Johnson, Seattle, WA (US); Marvin M. Theimer, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/887,088

(22) Filed: Oct. 19, 2015

(65) Prior Publication Data

US 2016/0266922 A1 Sep. 15, 2016

Related U.S. Application Data

(63) Continuation of application No. 13/074,970, filed on Mar. 29, 2011, now Pat. No. 9,165,120.

(51) Int. Cl.
| | |
|---|---|
| *H04L 29/00* | (2006.01) |
| *G06F 9/455* | (2018.01) |
| *G06F 21/00* | (2013.01) |
| *G06F 21/62* | (2013.01) |

(52) U.S. Cl.
CPC .......... *G06F 9/45558* (2013.01); *G06F 21/00* (2013.01); *G06F 21/62* (2013.01); *G06F 2009/45587* (2013.01); *G06F 2009/45595* (2013.01)

(58) Field of Classification Search
CPC ................. G06F 21/00; G06F 9/45558; G06F 2009/45587; G06F 2009/45595; G06F 21/62

See application file for complete search history.

(56) References Cited

U.S. PATENT DOCUMENTS

| | | | | |
|---|---|---|---|---|
| 2007/0136579 | A1* | 6/2007 | Levy ..................... | H04L 63/102 713/168 |
| 2009/0249284 | A1* | 10/2009 | Antosz ..................... | G06F 8/10 717/104 |
| 2012/0054624 | A1* | 3/2012 | Owens, Jr. .............. | H04L 41/22 715/735 |

* cited by examiner

*Primary Examiner* — Brandon S Hoffman
*Assistant Examiner* — Helai Salehi
(74) *Attorney, Agent, or Firm* — Knobbe Martens Olson & Bear, LLP

(57) ABSTRACT

Generally described, aspects of the present disclosure relate to for managing the configuration and security policies of hosted virtual machine networks. Hosted virtual machine networks are configured in a manner such that a virtual machine manager component can establish service manifests that correspond to information required by the virtual machine network from a user/customer. The virtual machine manager component can also publish in the service manifests contractual information, such as security risk assessments, that are deemed to have been provided and accepted by the user/customer in instantiating virtual machine networks. If the processed service manifest information remains valid, a substrate network process requests or independently instantiate services or components in accordance with the configuration information and security risk information included in the processed service manifest.

20 Claims, 16 Drawing Sheets

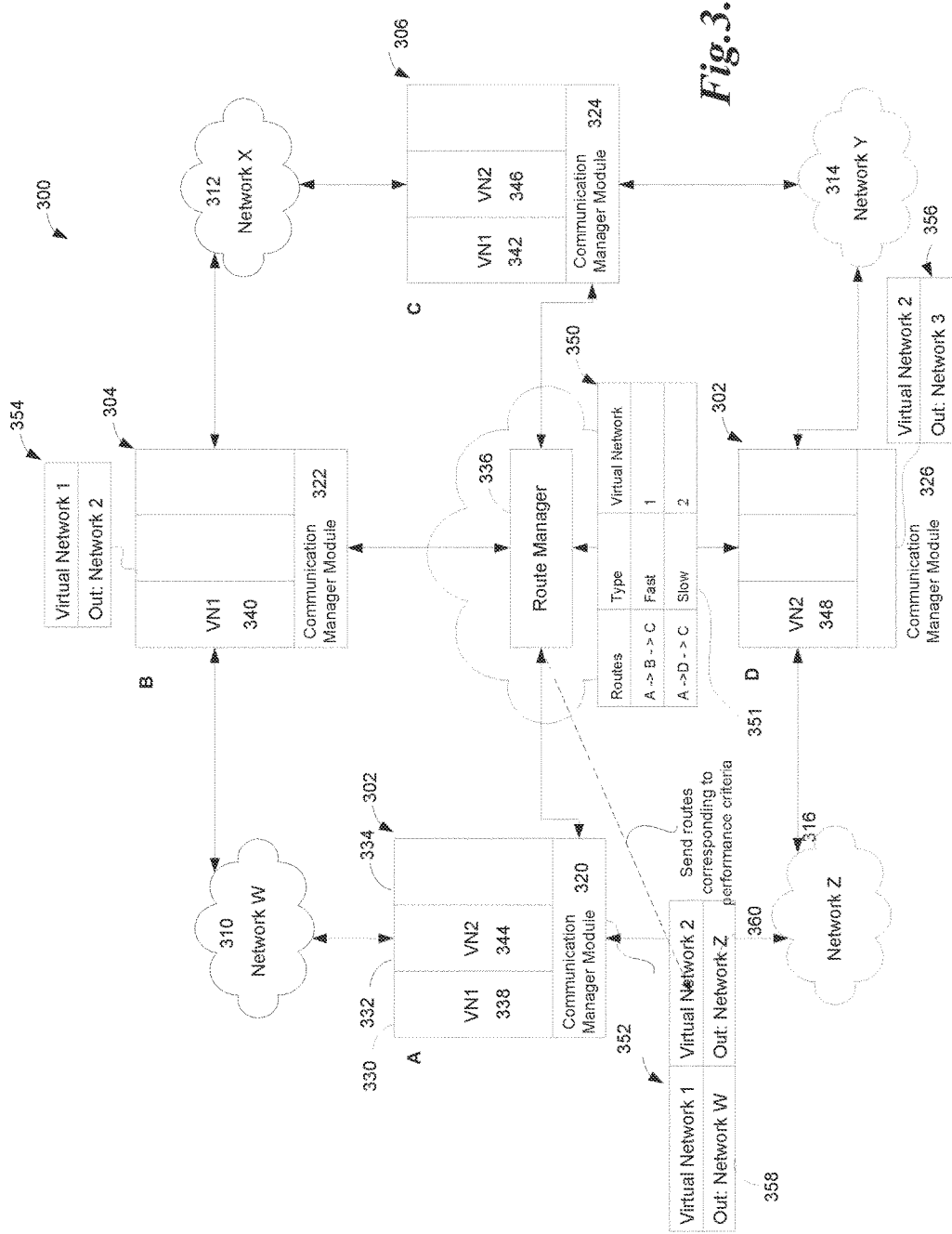

SERVICE MANIFESTS

CROSS-REFERENCE TO RELATED APPLICATIONS

This application is a continuation of U.S. patent application Ser. No. 13/074,970, entitled SERVICE MANIFESTS and filed Mar. 29, 2011, the entirety of which is incorporated herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, a single physical computing device can create, maintain, delete, or otherwise manage virtual machines in a dynamic matter. In the simplest embodiment, users can request single computing device computer resources from a data center. In more complex embodiments, users, such as system administrators, can request the configuration of virtual machine instances corresponding to a desired set of networked computing devices. In such embodiments, the data center can implement varying number of virtual machine instances to implement the functionality and configuration of the requested physical computing device network, generally referred to as a virtual machine network.

For virtual machine network embodiments, users often want to utilize various services, components (such as network-based appliances), or other functionality in accordance with at least aspects of the implementation of a hosted virtual machine network. In one aspect, users are required to configure various information about a hosted network, such as address space information, domain name service (DNS) zones information, resilient packet transport (RPT) information, and the like, in order for the desired functionality to be implemented in the hosted virtual machine network. Additionally, in another aspect, users are also required to delegate access to, or otherwise grant access, to at least a portion of the hosted virtual machine network to the entity providing desired functionality. As such, the virtual machine network service provider would prefer for users to be aware of the type permissions or authorizations that are delegated in conjunction with the utilization of requested functionality. Current approaches to the management of configuration information and delegated permission information are ad hoc in nature.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 3 is a block diagram of the substrate network of FIG. 1 illustrating a substrate network configuration associated with overlay networks;

DETAILED DESCRIPTION

Figure 1:
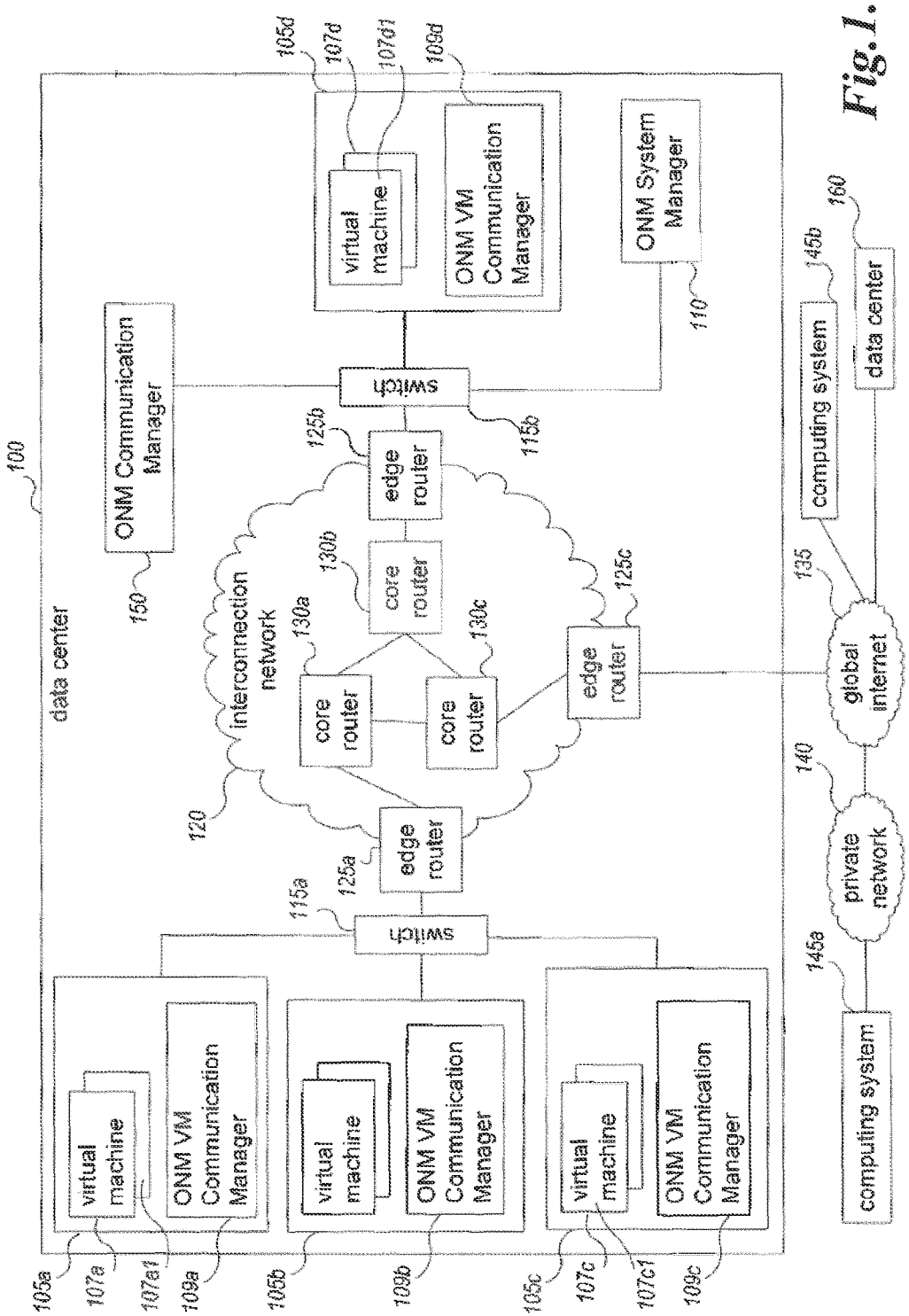
FIG. 1 is a block diagram illustrating an embodiment of a substrate network having computing nodes associated with a virtual computer network.

Generally described, aspects of the present disclosure relate to the management of virtual machine instances and other programmatically controlled networks. Specifically, embodiments of network data transmission analysis systems and methods are disclosed for managing configuration and authorization information of hosted virtual machine networks. Illustratively, a service provider can process configuration and authorization information associated with the hosted virtual machine network to facilitate the utilization of requested functionality within the hosted virtual machine network. More specifically, a virtual machine manager component can obtain and publish manifests, referred to generally as service manifests, that corresponds to configuration information required from a requesting user/customer. The virtual machine manager component can also include in the published service manifests authorization and permission information, that establish specific authorizations or permissions that must be required to be delegated by the requesting user/customer in order to utilize requested functionality. Illustratively, a virtual machine manager component then utilizes virtual machine network configuration information and security assessment information included within, or otherwise referenced by, the returned service manifest in managing access to a hosted virtual machine network by services or components corresponding to the requested functionality.

Illustrative embodiments of the systems and methods may be implemented on a virtual machine network overlaid on one or more intermediate physical networks that are used as a substrate network. Accordingly, the following section discusses various embodiments of illustrative managed networks for network data transmission analysis. However, the description of the managed networks for network data transmission is included for purposes of illustrative embodiments and examples and should not be construed as limiting. Following that is further discussion of various systems, components, methods, and interfaces that can be utilized in conjunction with the management of a hosted virtual machine network.

Managed Computer Networks for Network Data Transmission Analysis

With the advent of virtualization technologies, networks and routing for those networks can now be simulated using commodity hardware components. For example, virtualization technologies can be adapted to allow a single physical computing machine to be shared among multiple virtual machine networks by hosting one or more virtual machines on the single physical computing machine. Each such virtual machine can be a software simulation acting as a distinct logical computing system that provides users with the illusion that they are the sole operators and administrators of a given hardware computing resource. In addition, as routing can be accomplished through software, additional routing flexibility can be provided to the virtual machine network in comparison with traditional routing. As a result, in some implementations, supplemental information other than packet information can be used to determine network routing.

Aspects of the present disclosure will be described with regard to illustrative logical networking functionality for managed computer networks, such as for virtual computer networks that are provided on behalf of users or other entities. In at least some embodiments, the techniques enable a user to configure or specify a network topology, routing costs, routing paths, and/or other information for a virtual or overlay computer network including logical networking devices that are each associated with a specified group of multiple physical computing nodes. For example, a user (e.g., a network administrator for an organization) or service provider may configure a virtual or overlay network based on detected events, processing criteria, or upon request. With the network configuration specified for a virtual computer network, the functionally and operation of the virtual machine network can be simulated on physical computing nodes operating virtualization technologies. In some embodiments, multiple users or entities (e.g. businesses or other organizations) can access the system as tenants of the system, each having their own virtual machine network in the system. In one embodiment, a user's access and/or network traffic is transparent to other users. For example, even though physical components of a network may be shared, a user of a virtual machine network may not see another user's network traffic on another virtual machine network if monitoring traffic on the virtual machine network.

Figure 2:
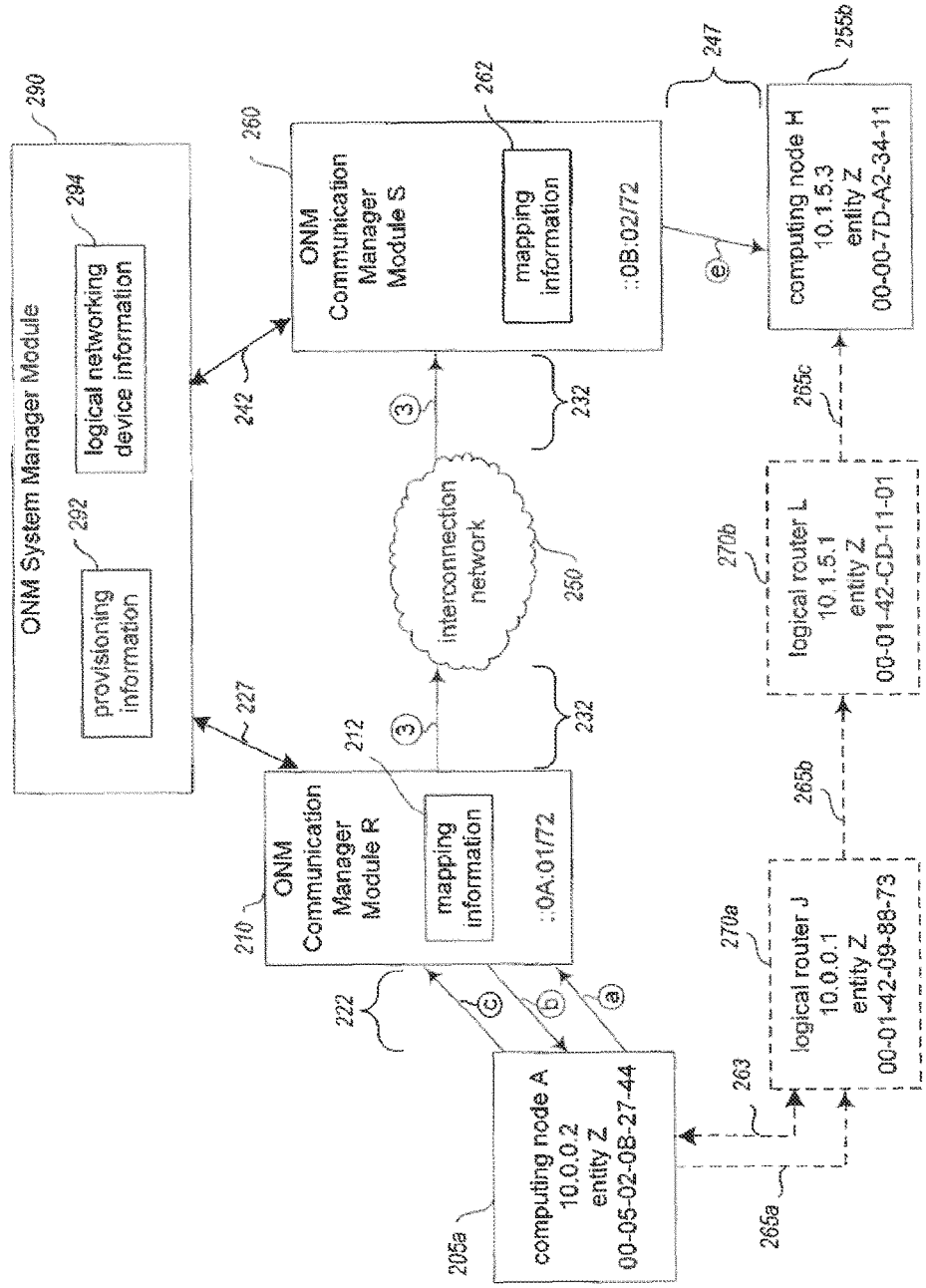
FIG. 2 is a block diagram of the substrate network of FIG. 1 illustrating logical networking functionality.

By way of overview, FIGS. 1 and 2 relate to embodiments where communications between multiple computing nodes of the virtual computer network emulate functionality that would be provided by logical networking devices if they were physically present. In some embodiments, some or all of the emulation are performed by an overlay network manager system. FIGS. 2-4B and 7B relate to embodiments where substrate routing decisions can be made independently of any simulated routing in the overlay network, allowing, for example, optimization of traffic on the substrate network based on information unavailable to a virtual machine network user. FIGS. 5A-7A relate to embodiments where routing decisions implemented on the virtual or overlay network are propagated to the substrate network. As previously discussed, one skilled in the relevant art will appreciate, however, that the disclosed virtual computer network is illustrative in nature and should not be construed as limiting.

Overlay Network Manager

FIG. 1 is a network diagram illustrating an embodiment of an overlay network manager system (ONM) for managing computing nodes associated with a virtual computer network. Virtual machine network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135, or general communication network, external to the data center 100. The global internet 135 can provide access to one or more computing systems 145a via private network 140, to one or more other globally accessible data centers 160 that each have multiple computing systems, and to one or more other computing systems 145b. The global internet 135 can be a publicly accessible network of networks, commonly referred to as the Internet, and the private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and a Communication Manager module 150 that executes on one or more other computing systems. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d.

This illustrative data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes the System Manager module 110, and is connected to edge router 125b. The physical sub-networks established by switches 115a-115b, in turn, are connected to each other and other networks (e.g., the global internet 135) via an intermediate communication network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager module 109 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual machine network over one or more intermediate physical networks that are used as a substrate network, such as over the interconnection network 120.

Furthermore, a particular virtual machine network can optionally be extended beyond the data center 100, such as to one or more other data centers 160 which can be at geographical locations distinct from the first data center 100. Such data centers or other geographical locations of computing nodes can be inter-connected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual machine network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109a can determine the actual physical network location corresponding to the destination virtual machine network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual machine network address for the virtual computer network, such as by using the sending virtual machine computing node 107a1's virtual machine network address as the source network address and by using the destination virtual machine computing node 107d1's virtual machine network address as the destination network address. The Communication Manager module 109d then forwards the modified communication to the destination virtual machine computing node 107d1. In at least some embodiments, before forwarding the incoming communication to the destination virtual machine, the Communication Manager module 109d can also perform additional steps related to security.

Further, the Communication Manager modules 109a and/or 109c on the host computing systems 105a and 105c can perform additional actions that correspond to one or more logical specified router devices lying between computing nodes 107a1 and 107c1 in the virtual machine network topology. For example, the source computing node 107a1 can direct a packet to a logical router local to computing node 107a1 (e.g., by including a virtual hardware address for the logical router in the packet header), with that first logical router being expected to forward the packet to the destination node 107c1 via the specified logical network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual machine network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network.

Logical/Virtual Networking

FIG. 2 illustrates a more detailed implementation of the ONM system of FIG. 1 supporting logical networking functionality. The ONM system includes more detailed embodiments of the ONM System Manager and ONM Communication Manager of FIG. 1. In FIG. 2, computing node A is sending a communication to computing node H, and the actions of the physically implemented modules 210 and 260 and devices of network 250 in actually sending the communication are shown, as well as emulated actions of the logical router devices 270a and 270b in logically sending the communication.

In this example, computing nodes A 205a and H 255b are part of a single virtual computer network for entity Z. However, computing nodes can be configured to be part of two distinct sub-networks of the virtual computer network and the logical router devices 270a and 270b separate the computing nodes A and H in the virtual machine network topology. For example, logical router device J 270a can be a local router device to computing node A and logical router device L 270b can be a local router device to computing node H.

In FIG. 2, computing nodes A 205a and H 255b includes hardware addresses associated with those computing nodes for the virtual computer network, such as virtual hardware addresses that are assigned to the computing nodes by the System Manager module 290 and/or the Communication Manager modules R 210 and S 260. In this example, computing node A has been assigned hardware address "00-05-02-0B-27-44," and computing node H has been assigned hardware address "00-00-7D-A2-34-11." In addition, the logical router devices J and L have also each been assigned hardware addresses, which in this example are "00-01-42-09-88-73" and "00-01-42-CD-11-01," respectively, as well as virtual machine network addresses, which in this example are "10.0.0.1" and "10.1.5.1," respectively. The System Manager module 290 maintains provisioning information 292 that identifies where each computing node is actually located and to which entity and/or virtual computer network the computing node belongs.

In this illustrative example, computing node A 205a first sends an address resolution protocol (ARP) message request 222-a for virtual hardware address information, where the message is expected to first pass through a logical device J before being forwarded to computing node H. Accordingly, the ARP message request 222-a includes the virtual machine network address for logical router J (e.g., "10.0.0.1") and requests the corresponding hardware address for logical router J.

Illustratively, the Communication Manager module R intercepts the ARP request 222-a, and obtains a hardware address to provide to computing node A as part of spoofed ARP response message 222-b. The Communication Manager module R can determine the hardware address by, for example, looking up various hardware address information in stored mapping information 212, which can cache information about previously received communications. Communication Manager module R can communicate 227 with the System Manager module 290 to translate the virtual machine network address for logical router J.

The System Manager module 290 can maintain information 294 related to the topology and/or components of virtual computer networks and provide that information to Communication Manager modules. The Communication Manager module R can then store the received information as part of mapping information 212 for future use. Communication Manager module R then provides computing node A with the hardware address corresponding to logical router J as part of response message 222-b. While request 222-a and response message 222-b actually physically pass between computing node A and Communication Manager module R, from the standpoint of computing node A, its interactions occur with local router device J.

After receiving the response message 222-b, computing node A 205a creates and initiates the sending of a communication 222-c to computing node H 255b. From the standpoint of computing node A, the sent communication will be handled as if logical router J 270a were physically implemented. For example, logical router J could modify the header of the communication 265a and forward the modified communication 265b to logical router L 270a, which would similarly modify the header of the communication 265b and forward the modified communication 265c to computing node H. However, communication 222-c is actually intercepted and handled by Communication Manager module R, which modifies the communication as appropriate, and forwards the modified communication over the interconnection network 250 to computing node H by communication 232-3. Communication Manager module R and/or Communication Manager module S may take further actions in this example to modify the communication from computing node A to computing node H or vice versa to provide logical networking functionality. For example, Communication Manager module S can provides computing node H with the hardware address corresponding to logical router L as part of response message 247-e by looking up the hardware address in stored mapping information 262. In one embodiment, a communication manager or computing node encapsulates a packet with another header or label where the additional header specifies the route of the packet. Recipients of the packet can then read the additional header and direct the packet accordingly. A communication manager at the end of the route can remove the additional header.

A user or operator can specify various configuration information for a virtual computer network, such as various network topology information and routing costs associated with the virtual 270a, 270b, and/or substrate network 250. In turn, the ONM System Manager 290 can select various computing nodes for the virtual computer network. In some embodiments, the selection of a computing node can be based at least in part on a geographical and/or network location of the computing node, such as an absolute location or a relative location to a resource (e.g., other computing nodes of the same virtual machine network, storage resources to be used by the computing node, etc.). In addition, factors used when selecting a computing node can include: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; or the like.

Route Selection on Substrate Network

FIG. 3 illustrates an example embodiment of a substrate network 300 having a route manager 336 capable of determining routes for overlay networks. The substrate network 300 can be composed of one or more substrate components or nodes, such as computing nodes, routing nodes, communication links or the like. In FIG. 3, the substrate network 300 includes computing nodes A 302, B 304, C 306, and D 308, which are capable of simulating various components of one or more associated overlay networks. The nodes can be located on the same data center or in multiple data centers. Computing node A is interconnected to node B via network W 310, node B is connected to node C by network X 312, node C is connected to node D by network Y 314, and node D is connected to node A by network Z 316. Networks W, X, Y, and Z can include one or more physical networking devices, such as routers, switches, or the like, and can include private or public connections. Components shown in FIG. 3, such as the computing nodes and communication manager modules, can implement certain of the features of embodiments described above with respect to FIGS. 1 and 2.

In FIG. 3, nodes A 302, B 304, C 306, and D 308 are associated with a respective Communication Manager module 320, 322, 324, and 326. The communication manager modules can implement certain of the features described in the Communication Manager 150, 210, 260 and VM Communication manager 109a, 109b, 109c, 109d of FIGS. 1 and 2. For example, the Communication Manager module 320 for node A can operate on a hypervisor monitor of the computing node and can direct the communication of one or more virtual computing nodes 330, 332, 334 of node A. The computing nodes, communication managers and Route Manager 336 can be part of the same ONM system. In one embodiment, the computing nodes run the XEN operating system (OS) or similar virtualization OS, with the communication managers operating on domain 0 or the first OS instance and the virtual computing nodes being domain U or additional OS instances.

The communication manager modules in FIG. 3 are in communication with a Route Manager module 336, operating on one or more computing devices, that directs routing for the substrate network 300. In one embodiment, the Route Manager operates as part of the ONM System Manager module 110, 290 of FIGS. 1 and 2, with functionally combined into a single module. The Route Manager can be located within a data center or at a regional level and direct traffic between data centers. In one embodiment, multiple Route Managers can operate in a distributed manner to coordinate routing across multiple data centers.

In FIG. 3, two virtual machine networks are associated with the substrate network 300. Virtual machine network 1 (VN1) has components 338, 340, 342, associated with virtual computing nodes on computing nodes A 302, B 304, and C 306. Virtual machine network 2 (VN2) has components 344, 346, 348 associated with virtual computing nodes on nodes A, C, and D 308.

As the Routing Manager module 336 directs network traffic on the substrate network 300, traffic can be directed flexibly and various network configurations and network costs can be considered. For example, routing paths can be determined based on specified performance levels for the virtual machine networks. In one embodiment, if the user for VN1 is entitled to a higher service level, such as for faster speed (e.g. lower latency and/or higher bandwidth), traffic associated with VN1 can be routed on a "fast" path of the substrate network 300. For example, in one embodiment, traffic for "platinum" users is prioritized over traffic for "gold" and "silver" users, with traffic from "gold" users prioritized over "silver" users. In one embodiment, at least some packets of the user with the higher service level are prioritized over packets of a user with a lower service level, for example, during times of network congestion. The user may be entitled to a higher level because the user has purchased the higher service level or earned the higher service level through good behavior, such as by paying bills, complying with the operator's policies and rules, not overusing the network, combinations of the same, or the like.

The Route Manager 336 can store user information or communicate with a data store containing user information in order to determine the target performance level for a virtual machine network. The data store can be implemented using databases, flat files, or any other type of computer storage architecture and can include user network configuration, payment data, user history, service levels, and/or the like. Typically, the Route Manager will have access to node and/or link characteristics for the substrate nodes and substrate links collected using various network monitoring technologies or routing protocols. The Route Manager can then select routes that correspond to a selected performance level for the virtual machine network and send these routes to the computing nodes. For example, network W 310 and Y 312 can be built on fiber optic lines while network Y 314 and Z 316 are built on regular copper wire. The Route Manager can receive network metrics data and determine that the optical lines are faster than the copper wires (or an administrator can designate the optical lines as a faster path). Thus, the Route Manager, in generating a route between node A 302 and node C 306 for "fast" VN1 traffic, would select a path going through network W and Y (e.g., path A-B-C).

In another situation, where the user for VN2 is not entitled to a higher service level, VN2 traffic from node A 302 to node B 306 can be assigned to a "slow" or default path through network Y 314 and Z 316 (e.g. path A-D-C). In order to track routing assignments, the Routing Manager can maintain the routes and/or route association in a data store, such as a Routing Information Base (RIB) or routing table 350. The Route Manager can also track the target performance criteria 351 associated with a particular virtual machine network.

In order to direct network traffic on the substrate network 300, the Routing Manager 336 can create forwarding entries for one or more of the Communication Manager modules 320, 322, 324, 326 that direct how network traffic is routed by the Communication Manager. The Communication Manager modules can store those entries in forwarding tables 352, 354, 356, or other similar data structure, associated with a Communication Manager. For example, for VN1, the Route Manager can generate a control signal or message, such as a forwarding entry 358, that directs VN1 traffic received or generated on node A 302 through network W 310 (on path A-B-C). Meanwhile, for VN2, the Route Manager can generate a control signal or message, such as a forwarding entry 360, which directs traffic received on node A through network Z. The Route Manager can send these forwarding entries to the node A Communication Manager 320, which can store them on its forwarding table 352. Thus, network traffic associated with VN1 and VN2, destined for node C 306 received or generated on node A can travel by either path A-B-C or path A-D-C based on the designated performance level for VN1 and VN2.

While the example of FIG. 3 depicts only two virtual machine networks, the Route Manager 336 can similarly generate and maintain routes for any number of virtual machine networks. Likewise, the substrate network 300 can include any number of computing nodes and/or physical network devices. Routes can be determined based on multiple performance criteria, such as network bandwidth, network security, network latency, and network reliability. For example, traffic for a virtual machine network suspected of being used for spamming (e.g. mass advertisement emailing) can be routed through network filters and scanners in order to reduce spam.

Figure 4A:
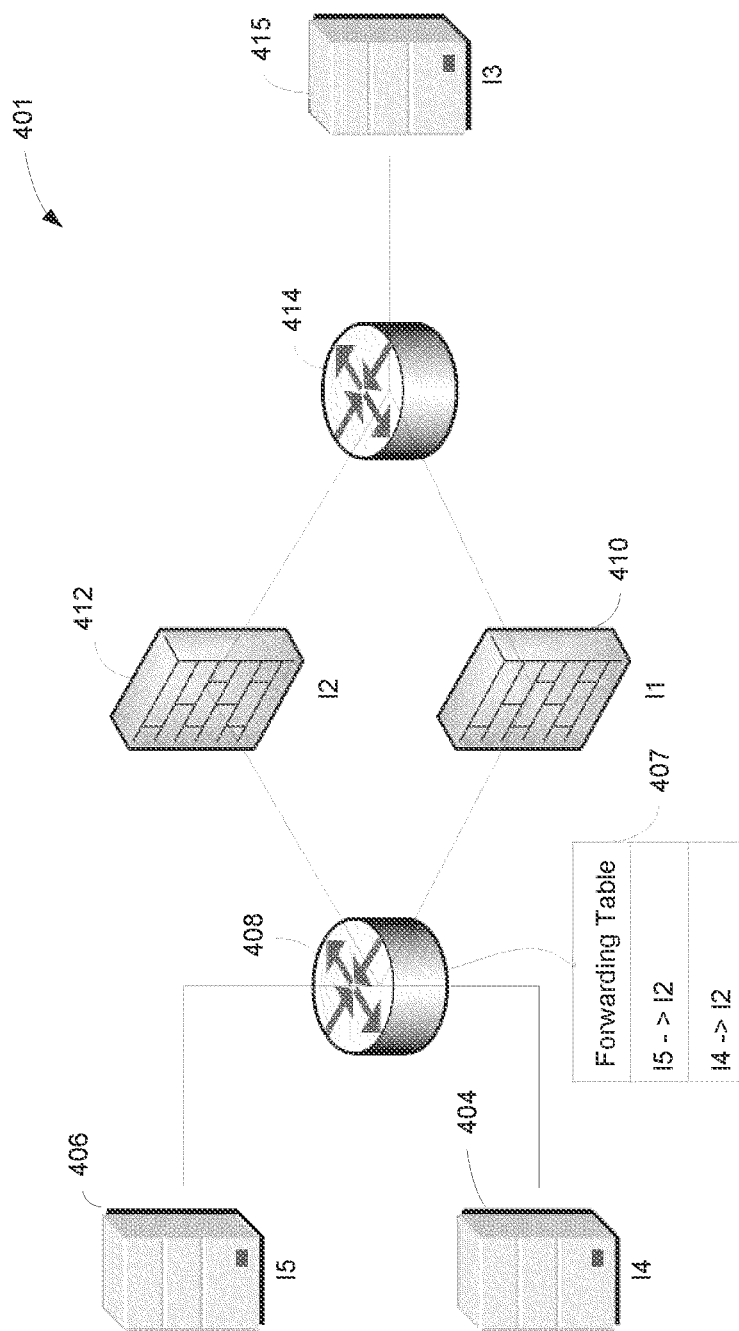
FIGS. 4A and 4B are block diagrams of the substrate network of FIG. 1 illustrating independently determined substrate routing.
Figure 4B:
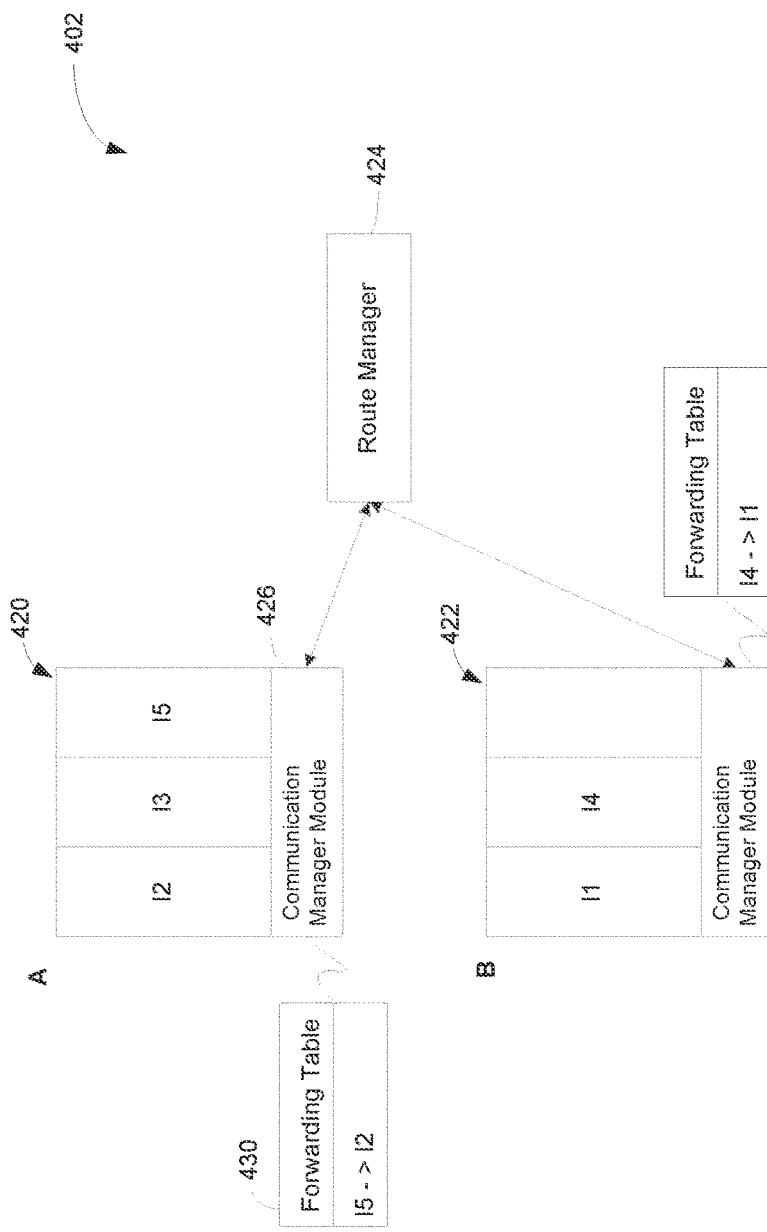

FIGS. 4A and 4B illustrate a virtual machine network 401 and corresponding substrate network 402 where substrate routing is independently determined from virtual routing. FIG. 4A illustrates a virtual machine network including several virtual machine network components. Virtual computing nodes I4 404 and I5 406 are connected to a logical router 408. The logical router can implement certain of the features described in the logical router 270a, 270b of FIG. 2. The logical router is connected to firewalls I1 410 and I2 412. The logical router is configured to direct traffic from I5 to I2 and I4 to I2, as would be the case if I2 were a backup firewall. The forwarding table associated with logical router 409 reflects this traffic configuration. I1 and I2 are connected to a second router 414. The second router is connected to another virtual computing node, I3 415. Thus, based on the topology and associated forwarding table of the virtual machine network 401, traffic from I4 and I5 to I3 passed through I2.

FIG. 4B illustrates an example topology of the substrate network 402 associated with the virtual machine network 401. The substrate network includes computing node A 420, computing node B, and a Route Manager 424. Substrate nodes A and B are each associated with a Communication Manager 426, 428. Node A is simulating the operation of virtual components I2, I3, and I5 while Node B is simulating the operation of virtual components on I1 and I4 on their respective virtual machines. The Route Manager can then use information regarding the assignments of virtual components to computing nodes to optimize or otherwise adjust routing tables for the substrate network. The Route Manager can receive such information from the Communication Managers and/or the System Manager. For example, assuming I1 and I2 are identical virtual firewalls, the Route Manager can determine that because I5 and I2 are located on the same computing node, while I4 and I1 are located on the other node, virtual machine network traffic can be routed from I5 to I2 and from I4 to I1 without leaving the respective computing node, thus reducing traffic on the network. Such a configuration is reflected in the illustrated forwarding tables 430, 432 associated with the Communication Managers. Thus, routes on the substrate network can be determined independently of virtual machine network routes.

In some embodiments, the Route Manager 424 or System Manager can optimize or otherwise improve network traffic using other techniques. For example, with reference to FIGS. 4A and 4B, another instance of I3 can be operated on node B 422, in addition to the instance of I3 on node A. Thus, virtual machine network traffic from I5-I2-I3 and I4-I1-I3 can remain on the same computing node without having to send traffic between computing nodes A and B. In one embodiment, substrate traffic can be optimized or otherwise improved without having different forwarding entries on the substrate and the virtual machine network. For example, with reference to FIG. 4B, I4 can be moved from computing node B 422 to node A 420, thus allowing virtual traffic from I5 and I4 to I2 to remain on the same computing node. In this way, a user monitoring traffic on logical router 408 would see that traffic is flowing according the forwarding table in the router, that is, substrate routing is transparent to the user. Other techniques for optimizing traffic by changing the association of virtual components with virtual machines and/or duplicating components can also be used.

In some situations, it can be desired that substrate routes reflect routes specified in the virtual table. For example, the virtual machine network user can wish to control how traffic is routed in the substrate network. However, rather than giving the user access to the substrate network, which could put other users at risk or otherwise compromise security, a data center operator can propagate network configuration or virtual machine network characteristics specified by the user for the virtual machine network to the substrate network. This propagated data can be used in generating routing paths in the substrate network, thus allowing the user to affect substrate routing without exposing the substrate layer to the user.

Route Selection on Overlay/Virtual Network

Figure 5A:
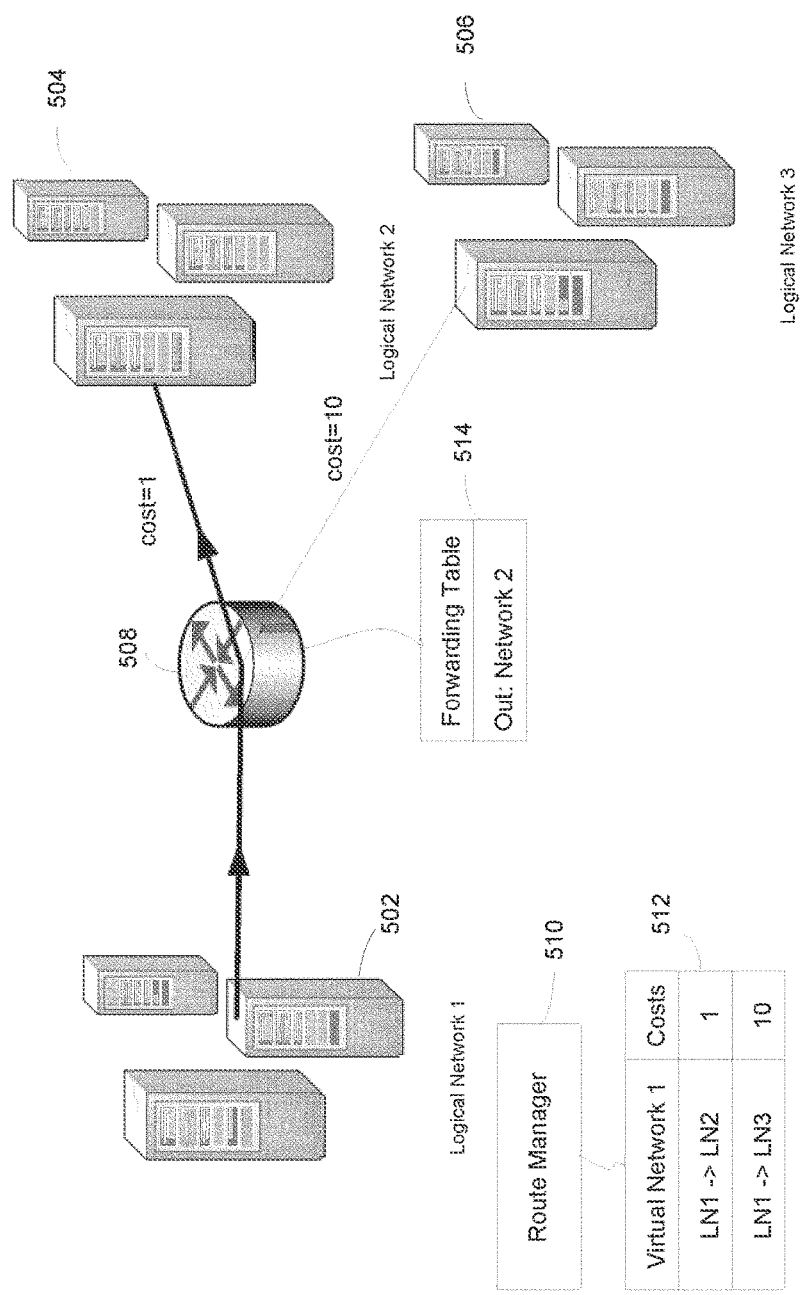
FIGS. 5A and 5B are block diagrams of the substrate network of FIG. 1 illustrating virtual route selection propagation to the substrate network.
Figure 5B:
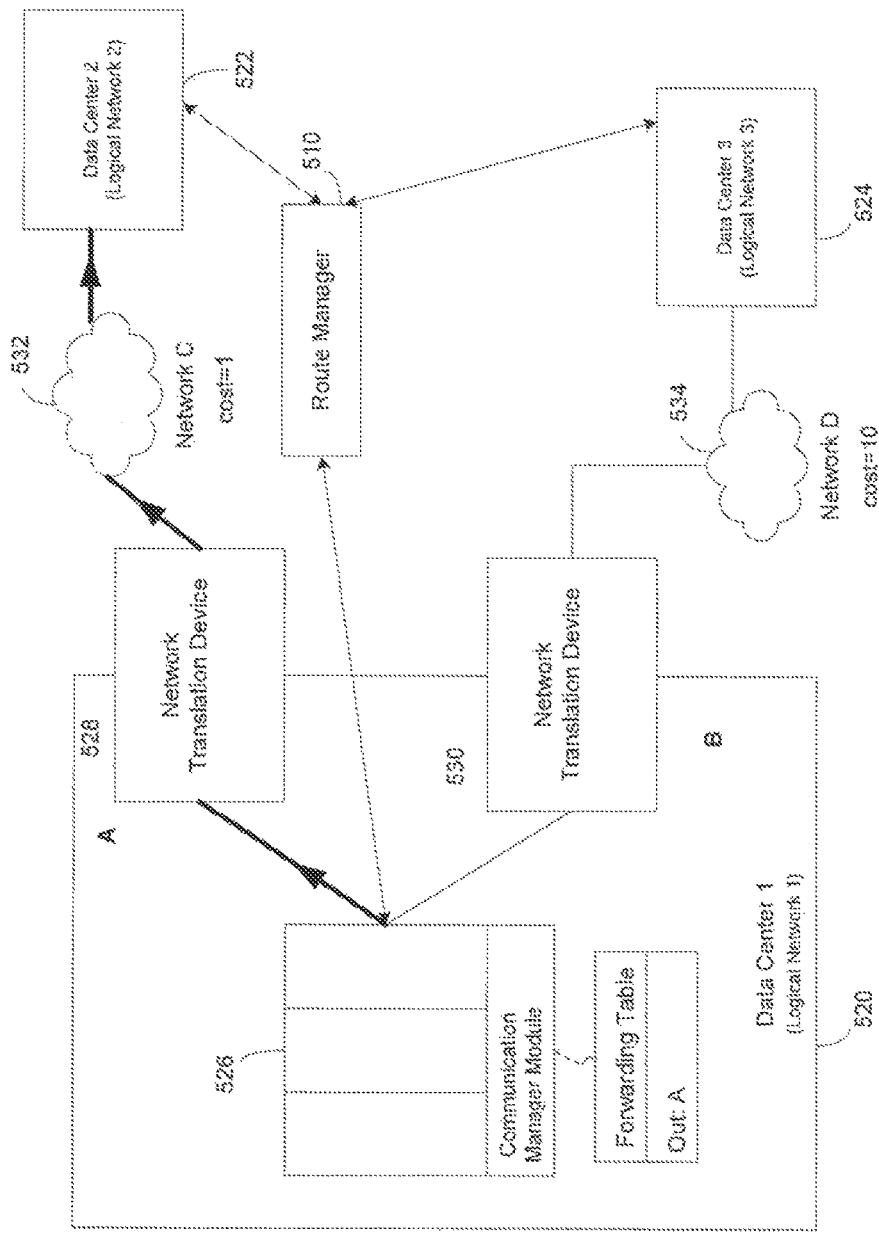

FIGS. 5A and 5B illustrate a virtual route selection propagated to the substrate network. FIG. 5A illustrates a virtual machine network topology where logical network 1 (LN1) 502 is connected to logical network 2 (LN2) 504 and logical network 3 (LN3) 506 by a logical router 508. The current preferred routing path specified by the user is from LN1 to LN2.

A user may wish to specify a route for various reasons. For example, routing costs through LN2 can be cheaper than LN3, such as when LN2 and LN3 are in different locations with different ISPs and one ISP charges lower rates than another. In another example, LN3 can be a backup virtual machine network for LN2, and used only in some situations, such as for handling overflow from LN2.

Referring back to FIG. 5A, the user can specify preferred routes through the virtual machine network and/or characteristics or costs associated with the virtual components, such as monetary costs, packet loss rates, reliability rate, and/or other metrics. These characteristics can be assigned to the virtual components, such as the virtual computing nodes, node links, logical routers/switches or the like. The Route Manager 510 can then determine routing tables 512 and/or forwarding tables 514 for the virtual machine network.

FIG. 5B illustrates an example of a substrate route that can correspond to the virtual route in FIG. 5A. In the figure, there are three data centers 520, 522, 524 corresponding to the logical networks 502, 504, 506 of FIG. 5A. In data center 1 (DC1), a computing node 526 is connected to a network translation device A (NTD A) 528 and a network translation device B (NTD B) 530. The network translation devices are connected to external networks C 532 and D 534, respectively.

The network translation devices can serve as a gateway or entry/exit point into the virtual machine network. In some embodiments, the network translation devices can translate between a first addressing protocol and a second addressing protocol. For example, if the virtual machine network is using IPv6 and the external networks are using IPv4, the network translation devices can translate from one addressing protocol to the other for traffic in either direction. In one embodiment, users connect from their private networks to the data centers via a VPN or other connection to a network translation device, which translates and/or filters the traffic between networks.

Referring back to FIG. 5B, network C 532 connects data center 2 522 to NTD A 528. Network D 534 connects data center 3 524 to NTD B 530. The Route Manager module 510 is in communication with data center 1 520, data center 2 522, and data center 3 524, particularly with the Communication Manager for the computing node 526.

From information associated with the virtual machine network, the Route Manager 510 can determine that the user wants to route traffic from LN1 to LN2. The Route Manager can then "favor" substrate routes associated with the LN1 to LN2 virtual path. For example, the Route Manager can specify a low routing cost (e.g. cost 1) for communications, such as data packets, travelling on Network C relative to Network D (e.g. cost 10) such that during route determination, routes through Network C are favored. In one embodiment, the Route Manager can apply a coefficient to stored substrate costs in order to favor one route over another. In another example, explicit routing paths can be set up corresponding to the virtual route. The Route Manager can identify routes in its routing table and communicate those routes with one or more Communication Managers.

Referring back to FIG. 5B, when the computing node 526 receives or generates a packet destined for LN2 or a network reachable from LN2, the computing node can be configured by the Route Manager to send packets through NTD A 528 as it lies on the route including network C 532.

By propagating virtual machine network configuration data to the substrate, and using that configuration data in substrate route calculation, a mechanism is provided for a virtual machine network user to affect substrate routing. In some embodiments, the virtual configuration data can be used in determining association of the virtual components with the substrate components. For example, components of the same virtual machine network can be associated with the same substrate computing node or on computing nodes connected to the same switch in order to minimize or otherwise improve substrate network traffic. Configuration data can also be provided the other way and, in some embodiments, the user and/or virtual machine network can be provided with additional substrate information, such as characteristics of the underlying associated substrate components (e.g., performance, costs) in order to make more informed routing decisions.

Figure 6:
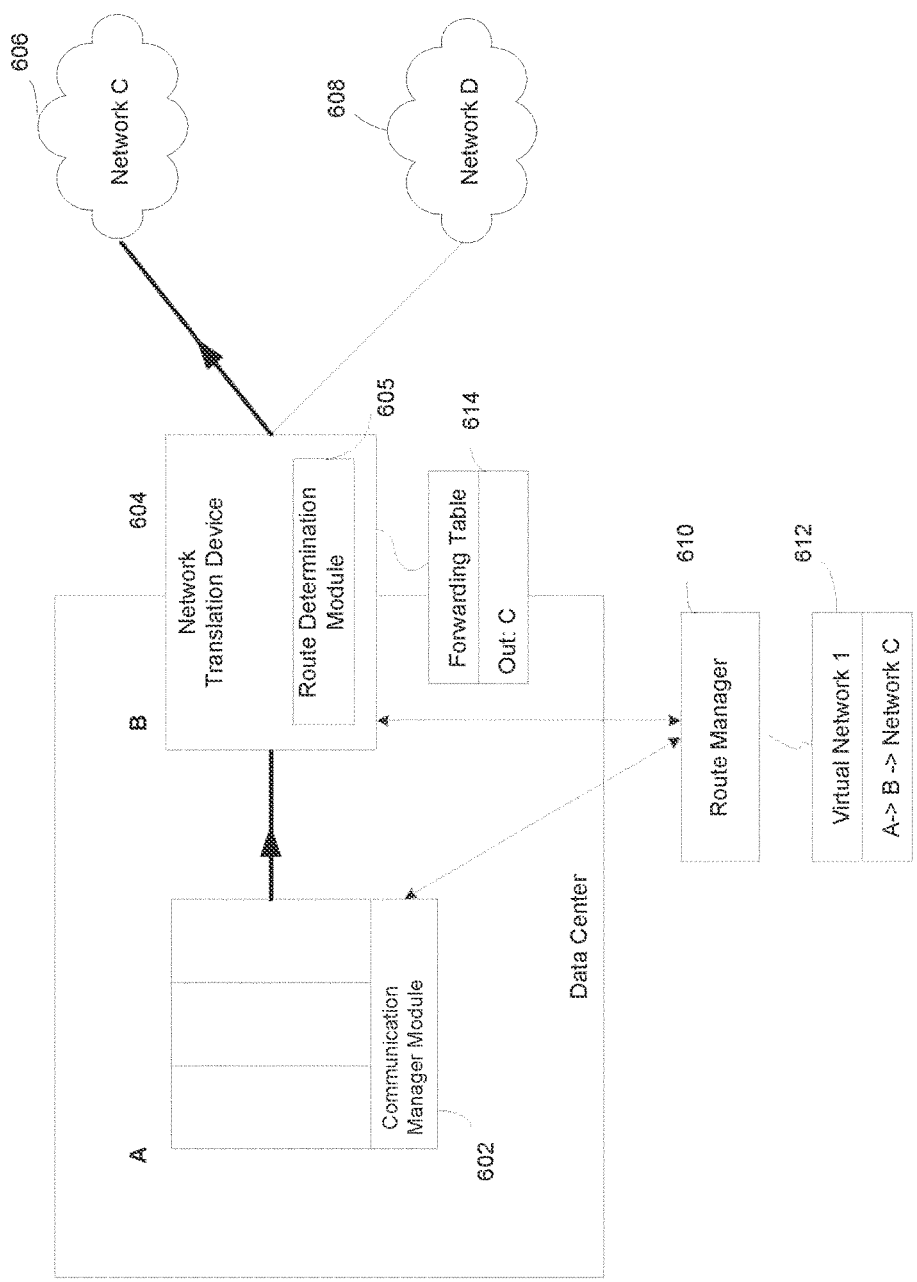
FIG. 6 is a block diagram of the substrate network of FIG. 1 illustrating the determination of routes into or out of a virtual machine network by network translation device.

FIG. 6 illustrates an example substrate network wherein a network translation device determines routes into or out of a virtual machine network. In FIG. 6, a communication, such as a data packet, leaves computing node A, which is associated with a virtual machine network, through NTD B 604. The network translation device can include a Route Determination module 605 for determining the packet route. NTD B is connected to network C 606 and network D 608.

In FIG. 6, the Route Manager 610 receives a network configuration or determines that route A-B-C is preferred or has a cheaper cost. The Route Manager can store the route in a routing table 612. The Route Manager can then send forwarding entries to the NTD B 604 that configure it to send traffic through network C 606. NTD B can contain multiple forwarding entries for multiple virtual machine networks, such that data for one virtual machine network can be sent through network C, while another virtual machine network sends data through network D. In some cases, network packets with the same source and/or destination are sent by different networks based on the associated virtual machine network.

In some embodiments, the substrate component may not have a Communication Manager or a Route Determination module and other ways of coordinating routing can be used. For example, a substrate component, such as an ordinary router or a network translation device, can be set up multiply on separate paths. Using blacklists, network traffic for a particular virtual machine network can be allowed on one path but blocked on others. The Route Manager can send a control signal or message updating the blacklists to manage the data flow.

In other embodiments, substrate components can implement IP aliasing, where, for example, "fast" path packets use one set of IP addresses, while "slow" path packets use another set of IP addresses. When the substrate component receives the packet, it can determine which path to use based on the IP address. The Route Manager can send a control signal or message to assign IP addresses to the components based on the type of traffic handled.

Other ways of differentiating how packets are handled by substrate components include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" path; and using Network Address Translation (NAT) devices on both ends of a network in order to redirect traffic into the network, such as by spoofing or altering an destination address for an incoming packing and/or altering an the source address of an outgoing packet. In some embodiments, the Route Manager generates control signals or messages for coordinating traffic on the substrate network for the various techniques described above.

Virtual Network Route Selection Process

Figure 7A:
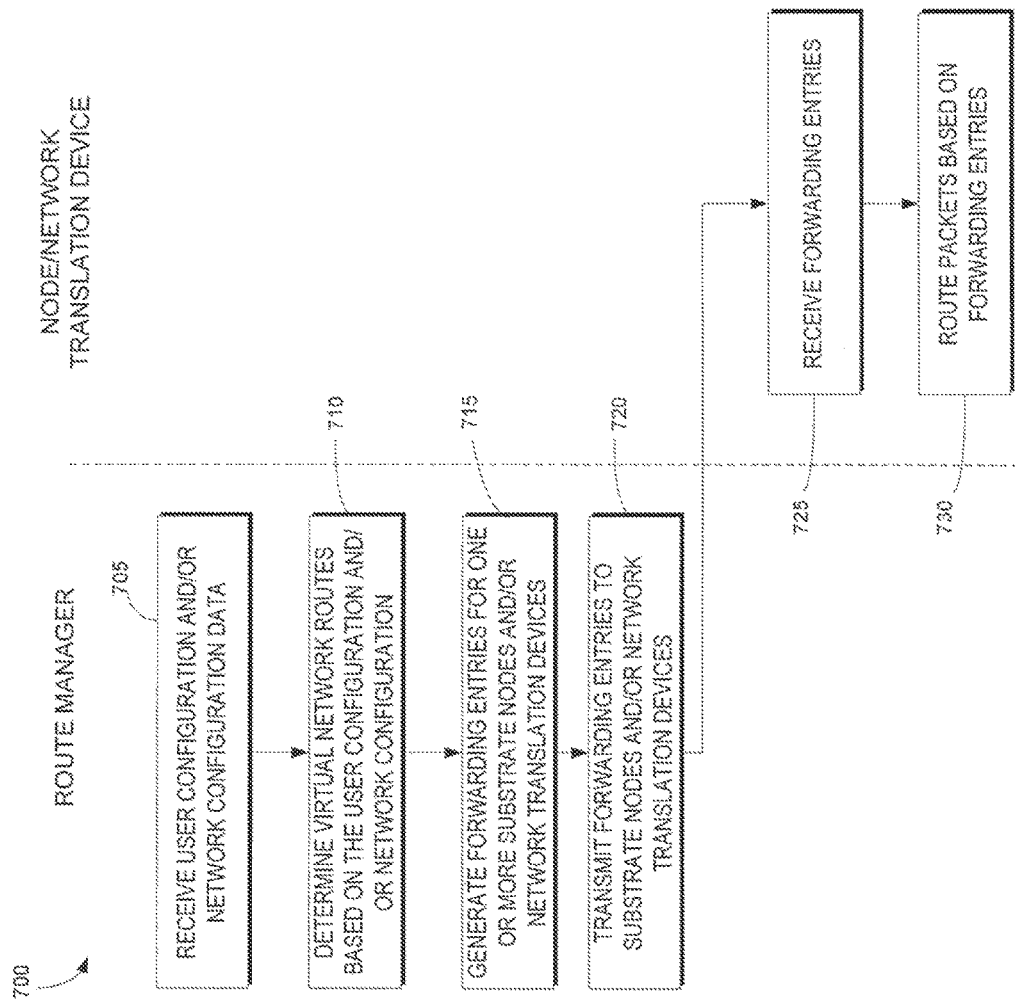
FIG. 7A illustrates a flow diagram for a process of propagating virtual routes to a substrate network.

FIG. 7A illustrates a flow diagram for a process 700 of propagating virtual routes to a substrate network usable in the example networks described above. The virtual routes can be based on network configuration data provided by a virtual machine network user, such as costs, component characteristics, preferred routes, and/or the like.

At block 705, the Route Manager module receives user configuration and/or network configuration data, such as, for example, policy based routing decisions made by the user. In some embodiments, a user interface is provided, allowing a user to specify configuration data. The Route Manager can receive the configuration data from a data store, for example, if user configuration and/or network configuration data are stored on the data store after being received on the user interface or otherwise generated. In some embodiments, the configuration data can include explicit routing paths through the virtual machine network. In some embodiments, the configuration data can specify associated costs for traversing components of the virtual machine network, such as links and/or nodes. These costs can be based on monetary costs, packet loss rates, reliability rate, and/or other metrics. These costs can be provided by the user to configure the virtual machine network provided by the data center operator. However, costs and other network configuration data can come from the data center operator themselves in addition to or instead of from the user. For example, the data center operator can use the virtual machine network to provide feedback to the user on routing costs, such as by associating monetary use costs for the substrate computing nodes and/or components. In one example, the data center operator can specify a high cost for a high speed network link or high powered computing node so that the virtual machine network user can take into account that cost in configuring the virtual machine network.

At block 710, the Route Manager module determines virtual machine network routes based on the user configuration and/or network configuration data. In some embodiments, routing protocols or the route determination algorithms of the routing protocols, such as BGP, OSPF, RIP, EIGRP, or the like, can be used to determine virtual routes.

At block 715, the Route Manager determines one or more forwarding entries for substrate network components, such as computing nodes, network translation devices, or the like. As the Route Manager can determine routing paths and propagate routing decisions to the substrate components, the Route Manager can coordinate routing within a data center and/or between multiple data centers.

At block 720, the Route Manager transmits the forwarding entries to the substrate components. At block 725, the substrate component receives the forwarding entries. The substrate network components can store the forwarding entries in FIB tables or similar structures. Generally, a Communication Manager on the substrate component receives and processes the forwarding entry and manages communications of the substrate component. However, as discussed above, network traffic can also be coordinated for substrate components without a Communication Manager using instead, for example, a NAT device or the like. In some embodiments, the Route Manager can send blacklist updates, manage tagging of the packets, generate stacked MAC addresses, or the like.

At block 730, the substrate components route packets received or generated according to the stored forwarding entries. Generally, a Communication Manager on the substrate component manages the packet routing and refers to the forwarding entries to make forwarding decisions.

Substrate Network Route Selection Process

Figure 7B:
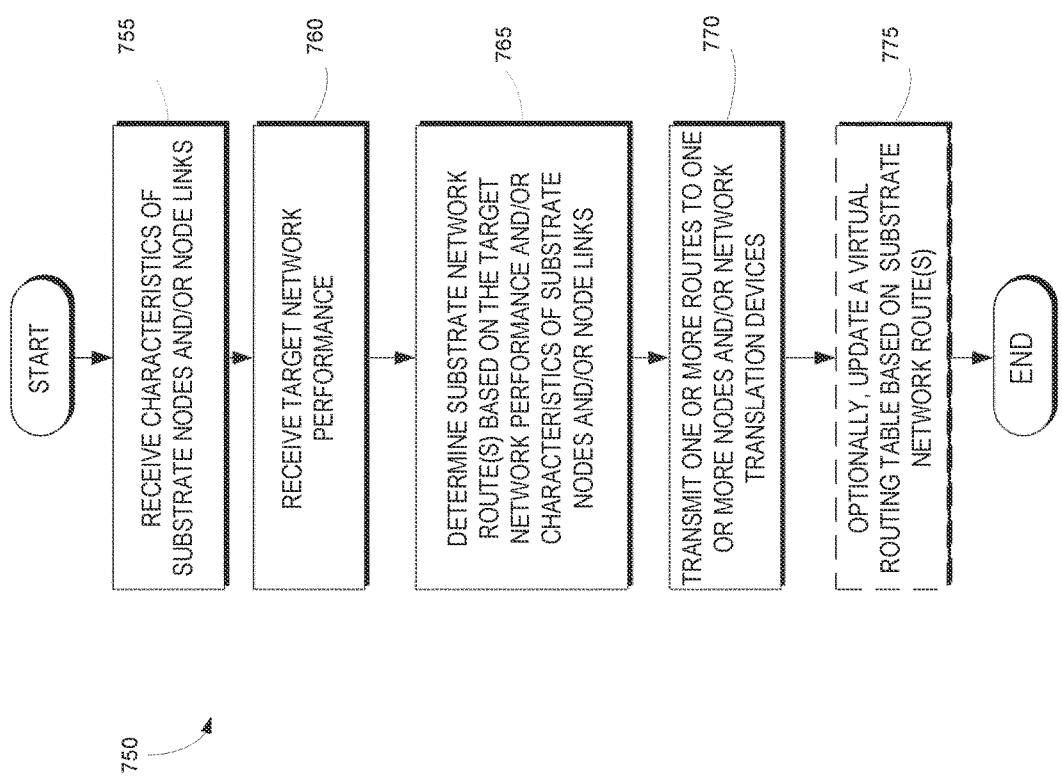
FIG. 7B illustrates a flow-diagram for a process of determining substrate routing based on target performance characteristics of the associated virtual machine network.

FIG. 7B illustrates a flow-diagram for a process 750 for determining substrate routing based on target performance characteristics of the associated virtual machine network usable in the example networks described above. In some instances, the Route Manager can optionally generate a virtual routing table for the virtual machine network before determining substrate routing. The virtual routing table can be used to determine virtual routing paths, allowing optimization of network traffic by selective association of the virtual machine network components with substrate computing nodes, such as by taking into account physical location and virtual machine network traffic patterns. However, generation of the virtual routing table is not necessary as the substrate routes can be determined independently of the virtual routes, as will be described below. In addition, user configuration and/or network configuration data provided by the user can be used to describe the virtual machine network, without needing to generate a virtual routing table.

At block 755, the Route Manager receives characteristics of the substrate nodes and/or node links. The Route Manager can receive the characteristics data from a data store. In some embodiments, a user interface is provided, allowing a user to specify characteristics data. The characteristics can describe such things as monetary costs, network bandwidth, network security, network latency, network reliability and/or the like. These characteristics can be used in a cost function for determining substrate routing paths. This information can be kept by the Route Manager or data source accessible by the Route Manager.

At block 760, the Route Manager receives a target network performance for the virtual machine network. The target performance can be based on a purchased service level by the user, user history, security data, or the like. For example, a service level purchased by a user can have minimum bandwidth, latency, or quality of service requirements. In another example, a user can be a new customer with an unknown payment history such that the user is provisioned on a "slow" virtual machine network in order to minimize incurred expenses in case the user fails to pay. In another example, a user identified as carrying dangerous or prohibited traffic, such as viruses, spam, or the like, can be quarantined to particular substrate components. During quarantine, the virtual machine network components can be assigned to specialized substrate components with more robust security features. For example, the substrate components can have additional monitoring functionally, such as a deep-packet scanning ability, or have limited connectivity from the rest of the substrate network.

At block 765, the Route Manager determines substrate network routes based on the target network performance and/or characteristics of the substrate nodes and/or links. In one embodiment, the Route Manager can use the characteristic data in a cost function for determining routes. Which characteristic to use or what level of service to provide can be determined by the performance criteria or target performance. For example, for a "fast" route, the Route Manager can use bandwidth and/or latency data for the substrate network to generate routes that minimize latency, maximize available bandwidth, and/or otherwise improve network performance.

The Route Manager can re-determine routes as needed based on changes in the network, the configuration data, and/or the performance level. For example, if a user has purchased N gigabits of "fast" routing but has reached the limit, the Route Manager can generate new routes and shift the user to "slow" routing.

At block 770, the Route Manager transmits forwarding entries for one or more routes to one or more nodes and/or network translation devices. In some embodiments, the Route Manager determines forwarding entries for the substrate components and sends those forwarding entries to the substrate components on the path. In some embodiments, the Route Manager can send blacklist updates, manage tagging of data packets, and/or generate stacked MAC addresses.

At block 775, the Route Manager can optionally update the virtual routing table based on substrate network routes. By changing the virtual machine network routing table based on the substrate routes, the virtual machine network can stay logically consistent with the behavior of the substrate network. Thus, users will not necessarily be confused by discrepancies in the virtual routing.

Virtual Machine Network Management within a Virtual Machine Network

Figure 8:
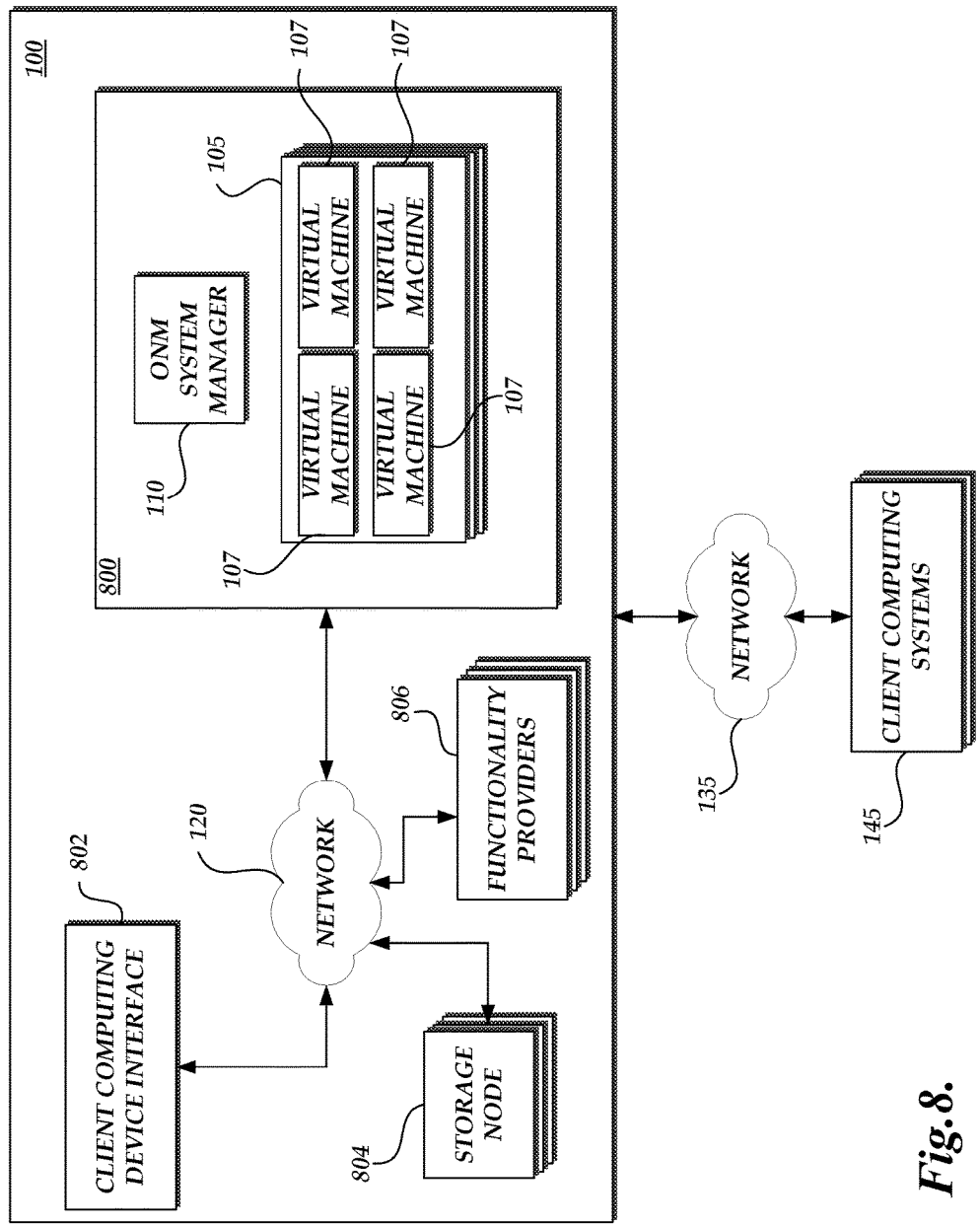
FIG. 8 is a simplified block diagram of the substrate network of FIG. 1 illustrating hosted virtual machine networks.
Figure 9:
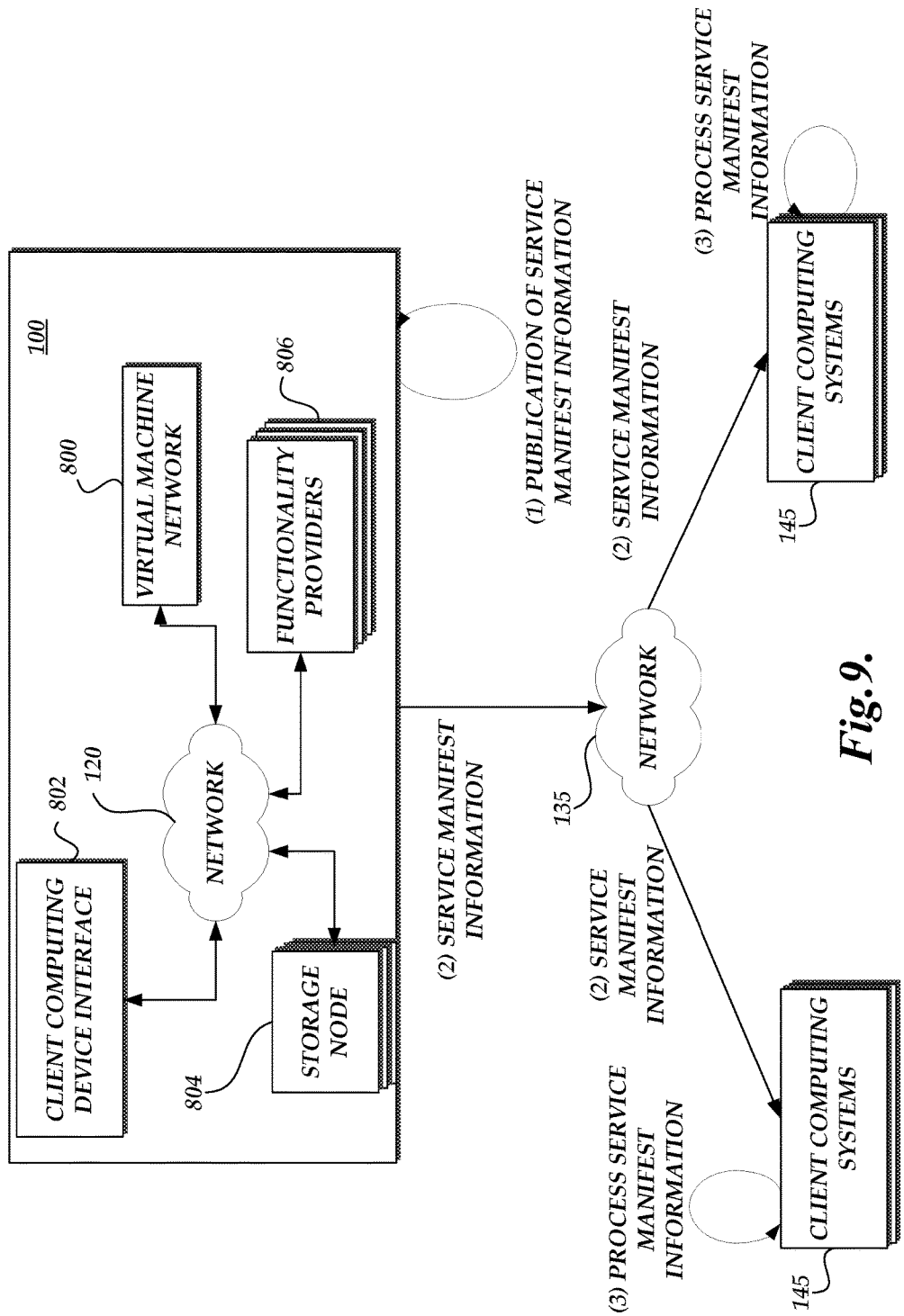
FIG. 9 is a simplified block diagram of the substrate network of FIG. 8 illustrating the publication of service manifests by a hosted virtual machine network manager component.

With reference now to FIGS. 8-13 various embodiments for the management of hosted virtual machine networks utilizing service manifests will be described. With reference to FIGS. 8 and 9, a simplified block diagram of the substrate network 100 of FIG. 1 will be described for purposes of illustrating the interaction between various components of the substrate network. However, one skilled in the relevant art will appreciate that illustrative interaction and communications may include, or otherwise involve, additional components not illustrated in the illustrative drawing figures.

With reference to FIG. 8, the substrate network 100 includes a number of physical computing systems 105 that host one or more virtual machine instances 107. One skilled in the relevant art will appreciate that the number of virtual machine instances hosted on each physical computing system 105 can vary according to the computing device resources associated with each individual physical computing system 105 and in accordance with the management policies of the substrate network 100. The substrate network 100 also includes a virtual machine manager component, such as ONM system manager 110, for managing the allocation of virtual machine instances 107 on the various physical computing systems 105. Although the virtual machine manager component is illustrated with regard to functionality implemented by a component of the substrate network 100, in an alternative embodiment, the virtual machine manager component may be implemented as a standalone component of the substrate network, integrated into a single physical computing system 105 or distributed as functionality implemented among multiple physical computing devices 105. The group of instantiated virtual machine instances 107 and ONM system manager 110 form a hosted virtual machine network, generally represented as hosted virtual machine network 800.

In communication with the ONM system manager 110 via the communication network 120 is a client computing device interface 802 for obtaining requests from various client computing systems 145 via the external communication network 135. The client computing device interface 802 can obtain various requests, such as requests for modifying or configuring sets of virtual machine instances 107, requests for implementing functionality, such as services, emulated components, etc. in a hosted virtual machine network, as well as other requests. Illustratively, the client computing device interface 802 can facilitate interaction with client computing systems 145 via established Application Protocol Interfaces ("APIs") provided by the substrate network 100. As will be described in greater detail below, the client computing device interface 802 facilitates the exchange of service manifests for instantiating hosted virtual machine networks.

Also in communication with the ONM system manager 110 are one or more storage nodes 804 for archiving or storing information associated with virtual machine service manifest information, such as hosted virtual machine network configuration information, delegated authority or permission information for a hosted virtual machine network, or other information corresponding to the execution of virtual machine instances 107. The storage nodes 804 can correspond to various storage media including physical storage media associated specifically with the substrate network 100. Additionally, or alternatively, the storage nodes 804 can correspond to various network based storage networks accessible to the substrate network 110 via communication network 120.

With continued reference to FIG. 8, in one embodiment, the functionality requested by a client computing device 145 for a specified hosted virtual machine network 800 can be provided by one or more functionality providers 806. Illustratively, the functionality providers 806 provide the requested functionality through the substrate network 100. Additionally, in various embodiments, the functionality providers 806 may correspond to third party vendors or other entities that are independent of the substrate network service provider or ONM system manager service provider that provide the requested functionality through the substrate network 100. As will be described in greater detail below, in one aspect, the utilization of the processed service manifest information facilitates access to hosted virtual machine network components by such third party vendors.

With reference now to FIG. 9, in one embodiment, the substrate network 100, such as the simplified substrate network illustrated in FIG. 8, obtains service manifest information from the functionality providers 806 or otherwise generates service manifest information. Illustratively, the service manifest information can include information utilized by the functionality providers 806 for configuration of the hosted virtual machine network 800 or in the utilization of the services or components by the hosted virtual machine network 800. Such configuration information will be generally referred to as configuration information. Illustratively, the configuration information can include, but is not limited to, network address information, proxy address information, DNS zone information, RPT information, network topology information, and the like. The configuration information can include information that is required in order to have a hosted virtual machine network instantiated or for a service or component to provide requested functionality to a hosted virtual machine network. Still further, the configuration information can include the specification of delegation information for delegating authority to specify/instantiate additional services or components.

In one aspect, some portion of the configuration information can be considered as mandatory in order for the hosted virtual machine network 800 to be instantiated or for the requested functionality to be provided. In another aspect, some portion of the configuration information can be designated as optional to be provided to the functionality provider 806 or is otherwise negotiable between the requesting user and the functionality provider 806.

In an illustrative embodiment, the service manifest information can also include information utilized to describe and specify permissions, authorizations or other delegations associated with the utilization of various services or other functionality within a hosted virtual machine network, generally referred to as permission information. In one aspect, the permission information can provide notice functionality utilized to identify security policies, historical information, or levels of security that a user will be expect in using a hosted virtual machine network. As will be explained in greater detail below, this aspect of the permission information may have an informative purpose for explaining security risk information. In another aspect, the permission information can also function in a manner that creates an enforcement/acceptance mechanism of specified permissions, authorizations or delegations that will be granted by the requesting user to the functionality provider 806. As will be explained in greater detail below, in one embodiment, once the published security manifest information is processed and returned by a client computing device 145, the substrate network 100 establishes policies/permissions for the functionality provider 806 that allows access to respective hosted virtual machine networks 800 when functionality is requested by the user or on behalf of a user. In still a further embodiment, the permission information can be associated with two or more levels such that users can optionally specify levels of permission or access.

With continued reference to FIG. 9, once the security manifest information is published or otherwise distributed to various client computing devices 145. Each client computing device 145 can individually process the security manifest information as part of preparation for instantiating a hosted virtual machine network, or component thereof. An illustrative screen display for specifying configuration information or publishing security risk information will be described with regard to FIG. 13.

Figure 10:
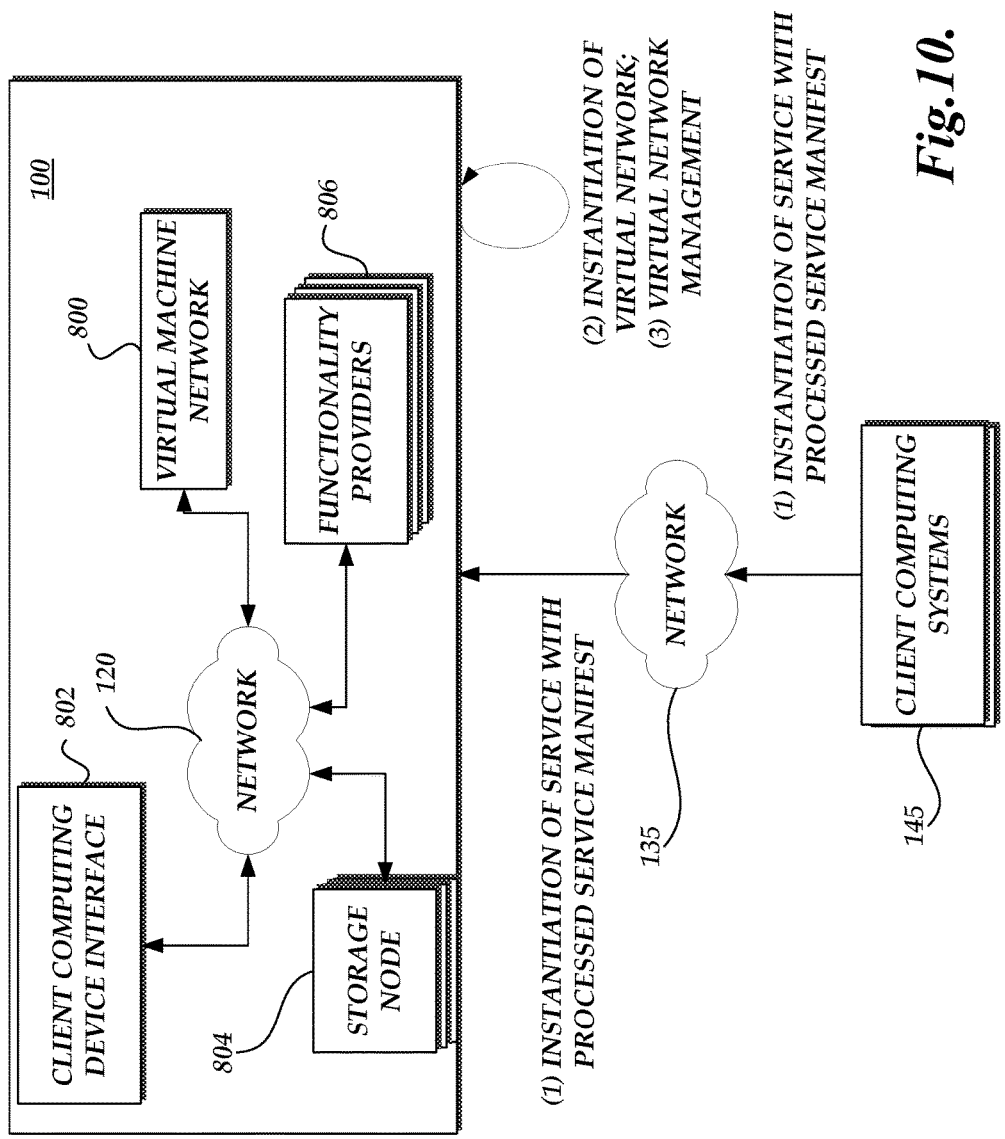
FIG. 10 is a block diagram of the simplified substrate network of FIG. 8 illustrating hosted virtual machine networks instantiating and configuring virtual machine networks utilizing service manifests.

With reference now to FIG. 10, a client computing device can transmit the processed service manifest information as part of instantiating a service to the substrate network 100 or otherwise independently transmitting the processed manifest information. Illustratively, the transmission of the processed service manifest information can be facilitated through the utilization of an API or set of APIs. Thereafter, the substrate network 100 can instantiate a hosted virtual machine network 800 based on the configuration information and permission information included in the processed service manifest provided by the client computing device. Illustratively, the processed service manifest information may include sufficient information for the substrate network 100 to host the virtual machine network without additional input from the client computing device 145 (e.g., a system administrator associated with the client computing device) to instantiate the hosted virtual machine network. Additionally, the processed service manifest information may include sufficient information to facilitate the addition and modification of additional services or components to the hosted virtual machine network without requiring additional input from the client computing device 145.

As described above, in another embodiment, the substrate network 100 processes the processed security manifest information provided by the client computing device 145 to generate a set of policies that can be stored. For example, assume the processed security manifest information included configuration information regarding network address and permission information granting access to functionality provider to aspects of a hosted virtual machine network. Based on the processed security manifest information, the substrate network 100 can generate or have generated policies that are utilized to evaluate subsequent requests (such as via an API to the substrate network 100) by a functionality provider. In this embodiment, the processed security manifest information is incorporated into one or more policy-based statements that can be modified by subsequent processed security manifests. The policy-based statements are representative of the configuration information and permission information included in the received processed service manifest information and can also include additional information provided by the functionality provider, the substrate network 100 or other third parties.

In one embodiment, the processed service manifest information provided by a client computing device or the policy-based statements representative of the processed service manifest information may be associated with expiration criteria or other criteria that influence the utilization of the processed service manifest information by the substrate network 100. In one example, the expiration criteria can specify date/time information in which the processed service manifest information remains valid for use by the substrate network 100 without further input from the client computing device 145. In another example, the expiration criteria can specify a maximum number of virtual machine instances or service calls for which the processed service manifest information remains valid. For example, the processed service manifest information may be valid for a single requested service from a functionality provider 806.

In a further example, the other criteria can correspond to financial criteria that can define cost maximums or minimums for which the processed service manifest information may be utilized by the substrate network 100. In this example, the processed service manifest information may be utilized to manage costs incurred by the client computing device 145 in requesting functionality from the functionality provider 806. In still another example, the other criteria can correspond to security protocols that define events and thresholds that cause the processed service manifest information to become invalid. For example, in the substrate network 100 may be utilized to monitor for specific information or types of information that are transmitted into or out of the hosted virtual machine network 800, such as account numbers, proper names, keywords, etc. If such information is detected, the processed service manifest information and any policy based statements can become immediately invalid. One skilled in relevant art will appreciate that other criteria may also be utilized.

As previously described, illustratively, the processed service manifest information can be utilized by the substrate network 100, such as the ONSM system manager component 110, in hosting the hosted virtual machine network. If the processed service manifest information remains valid, the substrate network 100 can process requests or independently instantiate services or components in accordance with the configuration information and permission information included in the processed service manifest, such as through policy-based statements generated from, or otherwise representative of the processed service manifest information. However, the client computing device 145 may need to update or modify the service manifest information upon the expiration of the processed service manifest information or a determined incompatibility of the processed service manifest information. For example, if the processed service manifest information did not include a specification of configuration information for certain types of services or components, the client computing device 145 may need to submit additional or updated service manifest information. In another example, a functionality provider 806 given limited permissions may request additional permissions or prompt client computing device users for additional permissions in exchange for enhanced services or increased service levels.

Figure 11:
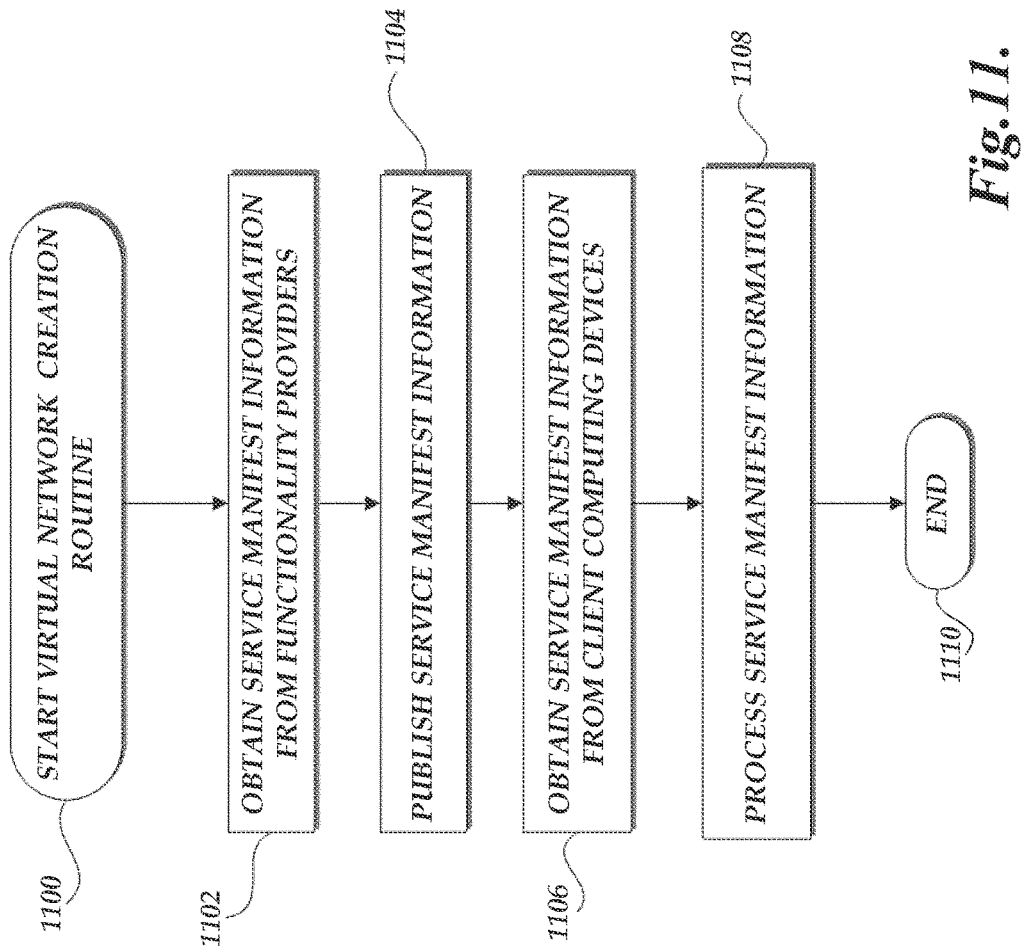
FIG. 11 is a flow-diagram illustrative of a virtual machine network security assessment configuration routine implemented by a virtual machine network manager.

With reference now to FIG. 11, a flow diagram illustrative of a hosted virtual machine network creation routine 1100 executed by a virtual machine manager, such as ONM system manager 110 of FIG. 8, will be described. At block 1104, the ONM system manager 110 causes the publication of the service manifest information to be completed by the client computing devices 145. Illustratively, the service manifest information may be published in accordance with the disclosure of APIs, via graphical user interfaces for eliciting responses from users, textual transmissions, and the like.

At block 1106, the ONM system manager 110 obtains processed service manifest information from a user via a client computing device 145. As previously described, the processed service manifest information may be transmitted by the client computing device 145 as part of a request for instantiation of a service (e.g., via an API or set of APIs). Alternatively, the processed service manifest information may be independently transmitted by the client computing device from any request for instantiating a service.

At block 1108, the ONM system manager 110 processes the processed service manifest information. Illustratively, the ONM system manager 110 can extract any configuration information included in the processed service manifest information for utilization in the instantiation and configuration of a virtual machine network. Additionally, the ONM system manager 110 can extract permission information if a user was given the opportunity to select from various levels of permissions. Additionally, the ONM system manager 110 can also generate various permission information based on the implicit authorization of the functionality provider 806 by nature of the returned processed service manifest.

At block 1110, the ONM system manager 110 can then store the processed information, such as in a profile, for utilization during the hosting of the requested virtual machine network. Illustratively, the stored information can be utilized without requiring additional input or decisions from the respective user. Additionally, in a further embodiment, the ONM system manager can utilize some portion of the processed service manifest information to generate one or more policies that are associated with the hosted virtual machine network 800. Specifically, in one illustrative example, the ONM system manager 110, or other component, can generate one or more policies or utilize a policy-based language that identifies the permissions granted to a specified functionality provider 806 associated with the processed service manifest information. The policies or policy based language can be maintained by the ONM system manager and utilize in the future to determine whether requests for access to or information about specific hosted virtual machine networks has been authorized by a system administrator associated with the target hosted virtual machine network. At block 1112, the routine 1100 ends.

Figure 12:
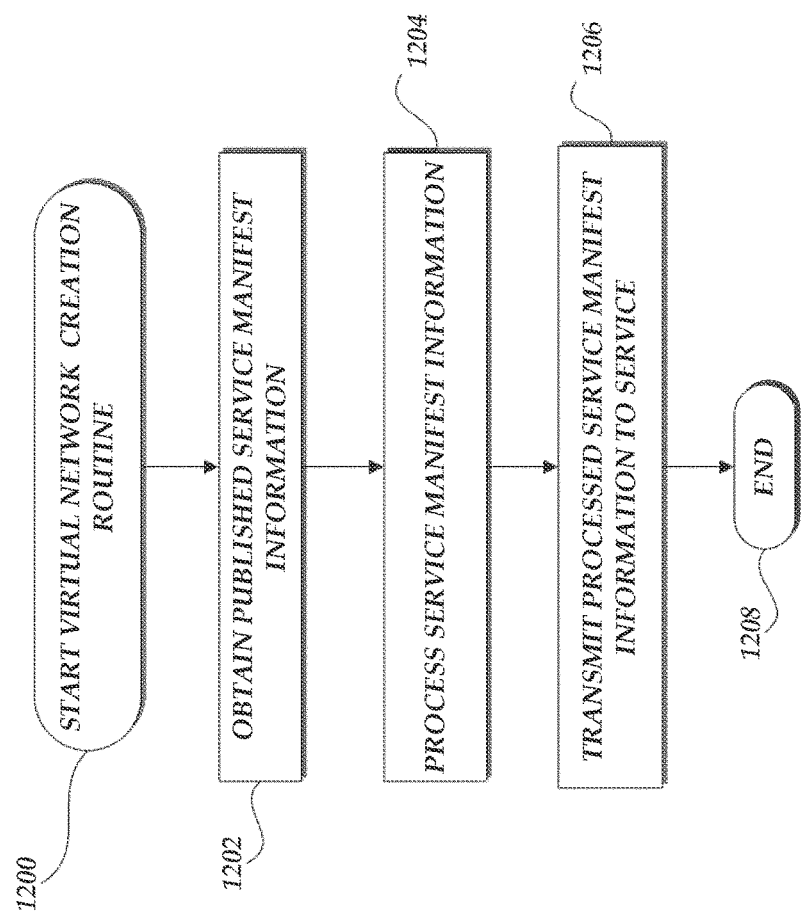
FIG. 12 is a flow-diagram illustrative of a virtual machine network security assessment routine implemented by a virtual machine network manager.

With reference now to FIG. 12, a flow diagram illustrative of a hosted virtual machine network creation routine 1200 executed by a client computing device 145 will be described. At block 1202, the client computing device 145 obtains a publication of the service manifest information from the substrate network 100. As previously described, the processed service manifest information may be transmitted by the client computing device 145 as part of a request for instantiation of a service (e.g., via an API or set of APIs). Alternatively, the processed service manifest information may be independently transmitted by the client computing device from any request for instantiating a service.

At block 1204, the client computing device 145 processes the service manifest information. As previously described, the service manifest information can include configuration information and security risk information. Accordingly, the processing of the service manifest information can include the specification of configuration information for utilization in the instantiation of services or other components of a hosted virtual machine network by the substrate network. Illustratively, the substrate network 100 can designate aspects of the configuration information as mandatory or optional. Additionally, to the extent any configuration information has previously been provided or a service manifest has been previously completed, the published service manifest information can include one or more pre-populated fields.

The service manifest information can also include permission information or authorization information. Accordingly, the processing of the service manifest information can include the presentation of the security risk information to the user or the identification of required permissions or authorizations required to be granted to functionality providers (via the client computing device 145). The processing of the permission information can also include the selection/specification of various permissions or permission levels that may affect the configuration information. For example, a user may designate a first level of permissions that correspond to a maximum level of permissions for the hosted virtual machine network 800. A second level of permissions may correspond to a lesser amount of permissions that would be granted to a functionality provider while still allowing the functionality provider 806 to provide some type of functionality/service to the hosted virtual machine network. The selection of a level of permission or the presentation of levels of permissions may indicate the type of services that the hosted virtual machine network will receive. Examples include, but are not limited to, timing, support services, reliability, and the like.

At block 1206, the processed service manifest information is transmitted to the substrate network. As previously described, the processed service manifest information may be transmitted by the client computing device 145 as part of a request for instantiation of a service (e.g., via an API or set of APIs). Alternatively, the processed service manifest information may be independently transmitted by the client computing device from any request for instantiating a service. At block 1208, the routine 1200 ends. One skilled in the relevant art will appreciate that routine 1200 may be repeated in the event of expiration of the processed service manifest information or if any configuration information is determined to be inconsistent or no longer valid.

Figure 13:
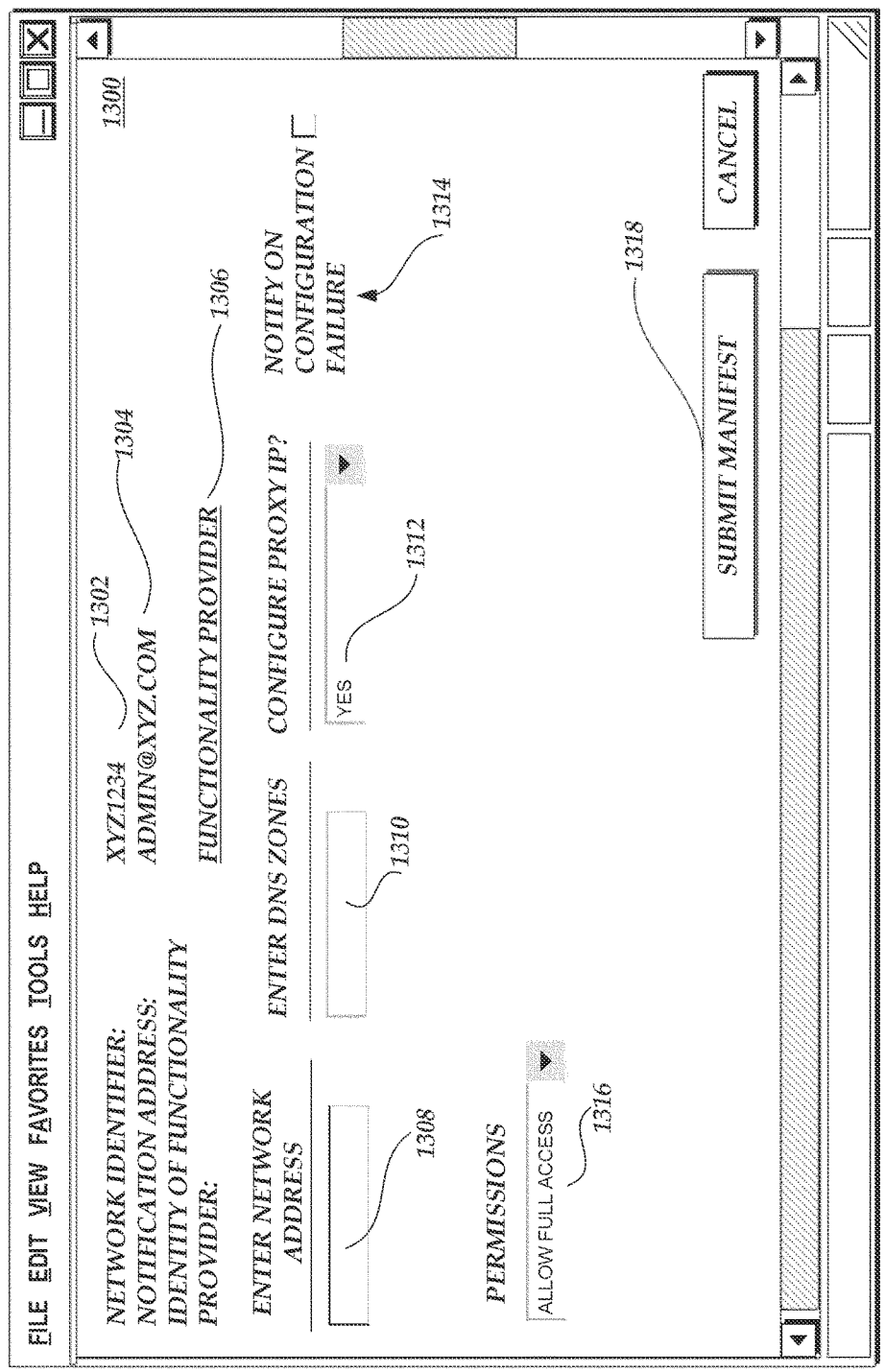
FIG. 13 illustrates an exemplary user interface for specifying hosted virtual machine network configurations and providing security risk assessments utilizing service manifests.

With reference now to FIG. 13, an illustrative embodiment of a user interface 1300 for processing service manifest information will be described. The user interface 1300 may contain a network identifier 1302 identifying the hosted virtual machine network address that will be utilized. The user interface 1300 may additionally include a notification address 1304 where user notifications may be provided. The user interface 1300 may further include an identification of the functionality provider 806 which provided the service manifest and which will be providing the requested functionality. The identification 1306 can include various links to more information provided by the functionality provider, including identification information, security risk information, APIs, and the like.

The user interface 1300 may further include a set of controls for specifying various configuration information. By way of example, the controls can include a network address dropdown 1308 or other means for specifying network addresses ranges. The controls of the user interface 1300 may further include a control 1310 or other means for specifying DNS zones. Still further, the controls of the user interface 1300 can include a drop down for determining whether proxy IP addresses will be utilized. One skilled in the relevant art will appreciate that any number of configuration criteria can be incorporated into a service manifest and that multiple screen displays be presented to a client computing device 145 for purposes of specifying configuration information. With continued reference to FIG. 13, the screen display 1300 can also include controls for notifying configuration failures 1314 and controls for submitting the completed service manifest or otherwise generating one or more API calls including the processed configuration and security risk information. Additionally, the screen display 1300 can include controls for specifying varying levels of permissions or access to hosted virtual machine networks. Examples can include allowing the selection of full access to the hosted virtual machine network, partial access to hosted virtual machine networks, a specification of ports that can be accessed, and the like.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more processors; and
   a computer-readable memory storing executable instructions that, when executed by the one or more processors, configure the system to:
   cause publication of virtual appliance manifest information corresponding to a virtual appliance provider, the virtual appliance manifest information comprising configuration information and permission information;
   receive, via a client computing device interface, a request to enable an instance of a virtual appliance within a virtual network of the client, the request comprising processed virtual appliance manifest information corresponding to the virtual appliance provider, the processed virtual appliance manifest information comprising processed configuration information and processed permission information;
   instantiate, using at least the processed configuration information, an instance of the virtual appliance within the virtual network of the client; and
   generate, based at least in part on at least the processed permission information corresponding to the appliance provider, access control information usable by the appliance provider to perform operations within the virtual network of the client.

2. The system of claim 1, wherein the executable instructions further configure the system to grant at least one permission in accordance with the processed permission information.

3. The system of claim 1, wherein the configuration information includes at least one of network address information, proxy address information, domain name service zone information, resilient packet transport information, and network topology information.

4. The system of claim 1, wherein the permission information includes at least one of a security policy, a security risk, a level of access, an authorization, or a delegation.

5. The system of claim 1, wherein the processed virtual network service manifest information includes an expiration criterion of the processed virtual machine network service manifest information.

6. The system of claim 3, wherein the processed virtual appliance manifest information is indicative of processing at least one of the network address information, the proxy address information, the domain name service zone information, the resilient packet transport information, and the network topology information.

7. The system of claim 4, wherein the processed virtual appliance manifest information is indicative of at least one of implementing the security policy, accepting the security risk, granting the level of access, authorizing the functionality provider, or delegating to the functionality provider.

8. The system of claim 5, wherein the executable instructions, when executed by the one or more processors, further configure the system to:
   determine that the expiration criterion has been satisfied; and
   responsive to the determination that the expiration criterion has been satisfied, cause disconnection of the functionality provider from the hosted virtual machine network.

9. A computer-implemented method comprising:
   publishing virtual appliance manifest information, the virtual appliance manifest information comprising at least one of configuration information corresponding to a virtual appliance provider and permission information corresponding to providing access to the virtual appliance provider from an instantiated virtual machine network;
   obtaining a request to enable an instance of a virtual appliance within a hosted virtual machine network, wherein the virtual appliance is executed by the virtual appliance provider on a different hosted virtual machine network, wherein the request corresponds to processed virtual appliance manifest information indicative of a configuration implemented by the hosted virtual machine network and a permission implemented by the hosted virtual machine network;
   causing the instance of the virtual appliance to be enabled within the hosted virtual machine network in accordance with the processed virtual appliance manifest information; and
   generating policy-based information based at least in part on the processed virtual appliance manifest information, wherein causing the instance of the virtual appliance be enabled within the hosted virtual machine network utilizes the policy-based information.

10. The computer-implemented method of claim 9, wherein obtaining the request to enable the instance of the virtual appliance within the hosted virtual machine network comprises obtaining the request via an application protocol interface.

11. The computer-implemented method of claim 9, wherein the permission information comprises a plurality of security levels, and wherein the processed virtual appliance manifest information includes a selection of one of the plurality of security levels by a user.

12. The computer-implemented method of claim 9, wherein the processed virtual appliance manifest information is associated with a security protocol, the method further comprising:
   monitoring transmissions associated with the hosted virtual machine network;

detecting that at least one of the transmissions violates the security protocol; and causing the processed virtual appliance manifest information to become invalid.

13. The computer-implemented method of claim 9 further comprising:

obtaining a second request to enable a second instance of the virtual appliance within a second hosted virtual machine network, the second request associated with a second processed virtual appliance manifest information;

generating updated policy-based information based at least in part on the policy-based information and the second processed virtual appliance manifest information; and causing the second instance of the virtual appliance to be enabled within the second hosted virtual machine network in accordance with the second processed virtual appliance manifest information, wherein causing the second instance of the virtual appliance to be enabled within the second hosted virtual machine network utilizes the updated policy-based information.

14. The computer-implemented method of claim 12, wherein the security protocol specifies at least one of an event and a threshold.

15. The computer-implemented method of claim 12, wherein the security protocol specifies a type of information, and wherein detecting that at least one transmission violates the security protocol comprises detecting that the at least one transmission contains the type of information specified by the security protocol.

16. A system comprising:
one or more processors; and
a computer-readable memory storing executable instructions that, when executed by the one or more processors, configure the system to:
cause publication of virtual appliance manifest information, the virtual appliance manifest information comprising configuration information corresponding to a virtual appliance provider and permission information corresponding to the virtual appliance provider for enabling an instance of a virtual appliance within a hosted virtual machine network;

obtain a request to instantiate a first hosted virtual machine network with an enabled instance of a virtual appliance in accordance with processed virtual appliance manifest information;

cause instantiation of the first hosted virtual machine network with the enabled instance of the virtual appliance; and generating, based at least in part on the processed virtual appliance manifest information, access control information usable by the virtual appliance provider to perform operations within the hosted virtual machine network.

17. The system of claim 16, wherein the processed virtual appliance manifest information includes a maximum cost criterion.

18. The system of claim 16, wherein the processed virtual appliance manifest information specifies a maximum number of requests that may be associated with the processed virtual appliance manifest information.

19. The system of claim 17, wherein the executable instructions, when executed by the one or more processors, further configure the system to determine that a cost associated with the request to instantiate the first hosted virtual machine network with the enabled instance of the virtual appliance does not exceed the maximum cost criterion.

20. The system of claim 18, wherein the executable instructions, when executed by the one or more processors, further configure the system to determine that a number of requests associated with the processed virtual appliance manifest information does not exceed the maximum number.

* * * * *